United States Patent
Yoneoka

(10) Patent No.: US 11,562,210 B2
(45) Date of Patent: Jan. 24, 2023

(54) STOCHASTICALLY DETERMINING TO ACCEPT A STATE TRANSITION FOR AN OPTIMIZATION DEVICE

(71) Applicant: FUJITSU LIMITED, Kawasaki (JP)

(72) Inventor: Noboru Yoneoka, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 623 days.

(21) Appl. No.: 16/679,124

(22) Filed: Nov. 8, 2019

(65) Prior Publication Data

US 2020/0151548 A1    May 14, 2020

(30) Foreign Application Priority Data

Nov. 12, 2018    (JP) .............................. JP2018-212135

(51) Int. Cl.
*G06N 3/04*    (2006.01)
*G06N 3/063*    (2006.01)

(52) U.S. Cl.
CPC ........... *G06N 3/0472* (2013.01); *G06N 3/063* (2013.01)

(58) Field of Classification Search
CPC .... G06N 3/0472; G06N 3/063; G06N 3/0445; G06N 5/003
See application file for complete search history.

(56) References Cited

U.S. PATENT DOCUMENTS

| | | | | |
|---|---|---|---|---|
| 8,296,120 B2* | 10/2012 | Phillips | .................. | G06F 30/34 703/2 |
| 2014/0236869 A1* | 8/2014 | Fujimaki | ................. | G06F 17/16 706/11 |
| 2018/0107172 A1 | 4/2018 | Takatsu | | |

FOREIGN PATENT DOCUMENTS

| | | |
|---|---|---|
| JP | 10-328155 | 12/1998 |
| JP | 2014-160457 | 9/2014 |
| JP | 2018-63626 | 4/2018 |

\* cited by examiner

*Primary Examiner* — Brent Johnston Hoover
(74) *Attorney, Agent, or Firm* — Fujitsu Patent Center

(57) ABSTRACT

A processor holds the second change value of the energy value which has been calculated by the processor and corresponds to each of a predetermined number of state transitions, in entries corresponding to the input identification information k. When the processor stochastically determines whether or not any of the state transitions is accepted, by a relative relation between the first change value and thermal excitation energy based on the temperature value, the first change value of the energy value calculated by the processor, and a random number value, the processor stochastically determines whether or not any of the state transitions is accepted, by adding the offset value y to the first change value. The offset value y is obtained by multiplying the second change value held by any entry selected from the entries based on the input identification information k, by coefficient information α.

9 Claims, 20 Drawing Sheets

FIG. 2
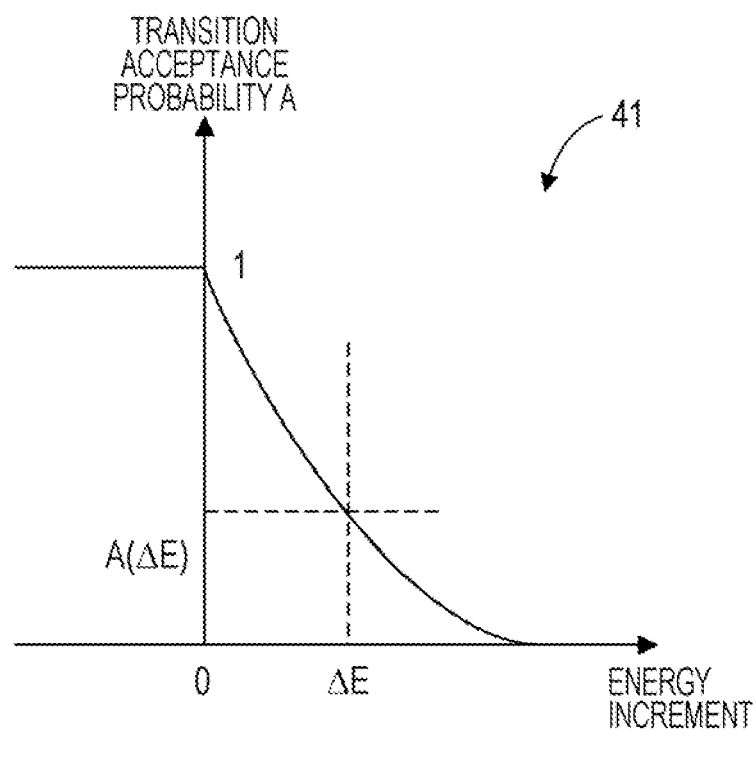
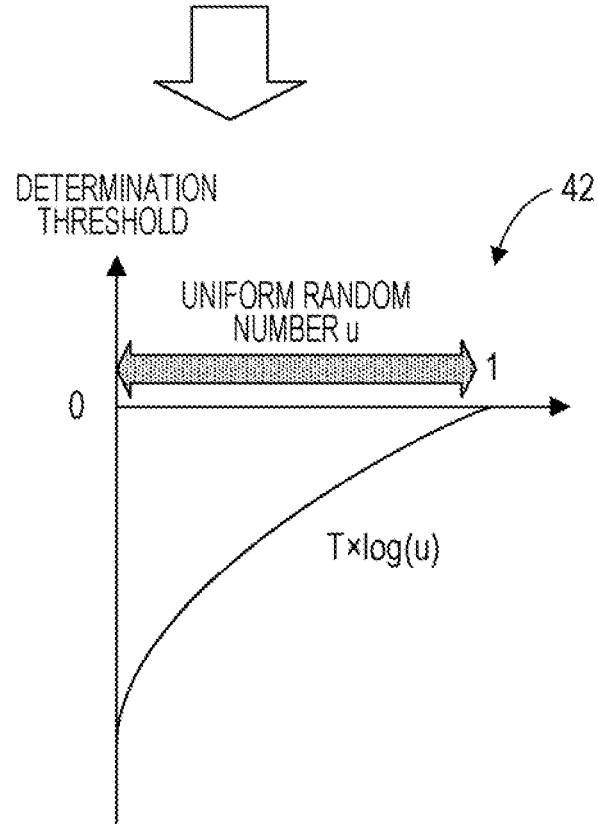

FIG. 10

| k | ΔE$_i$ |
|---|---|
| 1 | 5951 |
| 2 | 6039 |
| 3 | 7254 |
| 4 | 7509 |
| 5 | 7574 |
| 6 | 7602 |
| 7 | 7602 |
| 8 | 7624 |
| 9 | 7708 |
| 10 | 7795 |
| 11 | 7897 |
| 12 | 8004 |
| 13 | 8078 |
| 14 | 8108 |
| ... | ... |

| INDEX L | INDEX R | RELATION BETWEEN $\Delta E_L$ AND $\Delta E_R$ | SELECTION RESULT |
|---|---|---|---|
| EQUAL TO OR GREATER THAN 0 | EQUAL TO OR GREATER THAN 0 | $\Delta E_L \leq \Delta E_R$ | L |
| EQUAL TO OR GREATER THAN 0 | EQUAL TO OR GREATER THAN 0 | $\Delta E_L > \Delta E_R$ | R |
| -1 | EQUAL TO OR GREATER THAN 0 | d/c | R |
| EQUAL TO OR GREATER THAN 0 | -1 | d/c | L |
| -1 | -1 | d/c | L |

Z1

STOCHASTICALLY DETERMINING TO ACCEPT A STATE TRANSITION FOR AN OPTIMIZATION DEVICE

CROSS-REFERENCE TO RELATED APPLICATION

This application is based upon and claims the benefit of priority of the prior Japanese Patent Application No. 2018-212135, filed on Nov. 12, 2018, the entire contents of which are incorporated herein by reference.

FIELD

The embodiments discussed herein are related to an optimization device and a control method of the optimization device.

BACKGROUND

As a method of solving a multivariate optimization problem which is not easily handled by a Neumann-type computer, there is an optimization device (may also be referred to as an Ising machine or a Boltzmann machine) using an Ising-type energy function. The optimization device calculates a problem to be calculated by replacing the problem with an Ising model which is a model representing a spin behavior which is a rotation of electrons in a magnetic material.

The optimization device is also capable of being modeled, for example, using a neural network. In this case, each of a plurality of bits (spin bits) that corresponds to a plurality of spins included in the Ising model functions as a neuron that outputs 0 or 1 in accordance with a weighting factor (also referred to as a coupling factor) indicating the magnitude of interaction between other bits and the own bits. The optimization device uses, for example, a probabilistic search method, such as simulated annealing, to find a combination of values of bits from which the minimum value among values (referred to as energy) of an energy function (also referred to as cost function or objective function) as described above, as an optimal solution.

For example, an optimization device that calculates a combination of values of bits, which cause energy to be the minimum, by performing simulated annealing with a digital circuit is proposed. The optimization device calculates an energy change by changing by one bit at a time and determines whether or not to permit the change of the bit in accordance with a comparison between the energy change and a noise value corresponding to the temperature. When a state transition due to the bit change does not occur, the optimization device adds an offset value to the energy change and then determines whether or not to permit the bit change. Thus, the escape from the local solution is accelerated, and a calculation time is reduced. The optimization device increases the offset value little by little when the state transition does not occur, and resets the offset value to 0 when the state transition occurs.

Japanese Laid-open Patent Publication No. 2018-63626, Japanese Laid-open Patent Publication No. 10-328155, and Japanese Laid-open Patent Publication No. 2014-160457 are examples of related art.

SUMMARY

According to an aspect of the embodiments, an optimization device includes: a memory; and a processor coupled to the memory and the processor configured to: calculate a first change value of the energy value for each of a plurality of state transitions, in a case where a state transition occurs due to a change of any value of a plurality of state variables included in an evaluation function representing an energy value, control a temperature value indicating a temperature, and when it is stochastically determined whether or not any of the plurality of state transitions is accepted, by a relative relation between the first change value and thermal excitation energy based on the temperature value, the first change value, and a random number value, stochastically determine whether or not any of the plurality of state transitions is accepted, by adding an offset value to the first change value, the offset value being obtained by multiplying a second change value held by any entry selected from a plurality of entries based on identification information, by coefficient information, the second change value being one of a plurality of second change values of the energy value corresponding to a predetermined number of times of state transitions calculated by the processor.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of a determination threshold compared with an energy change value;

FIG. 10 is a diagram illustrating an example of the held energy change value;

FIG. 20 is a diagram illustrating an example of a selection logic of the ΔE selection unit.

DESCRIPTION OF EMBODIMENTS

In the method in the related art, in which an offset value is added when a state transition does not occur, the magnitude of the offset value becomes a problem. For example, if the offset value is too small, it is not possible to sufficiently reduce a time to escape from a local solution. If the offset value is too large, a difference of an acceptance probability of a state transition for each energy change is reduced. If the difference is reduced, a branching ratio for transitioning from one state to another state deviates from an appropriate branching ratio in simulated annealing, and the accuracy of the solution is degraded.

Hereinafter, embodiments will be described with reference to the drawings.

First Embodiment

A first embodiment will be described.

Figure 1:
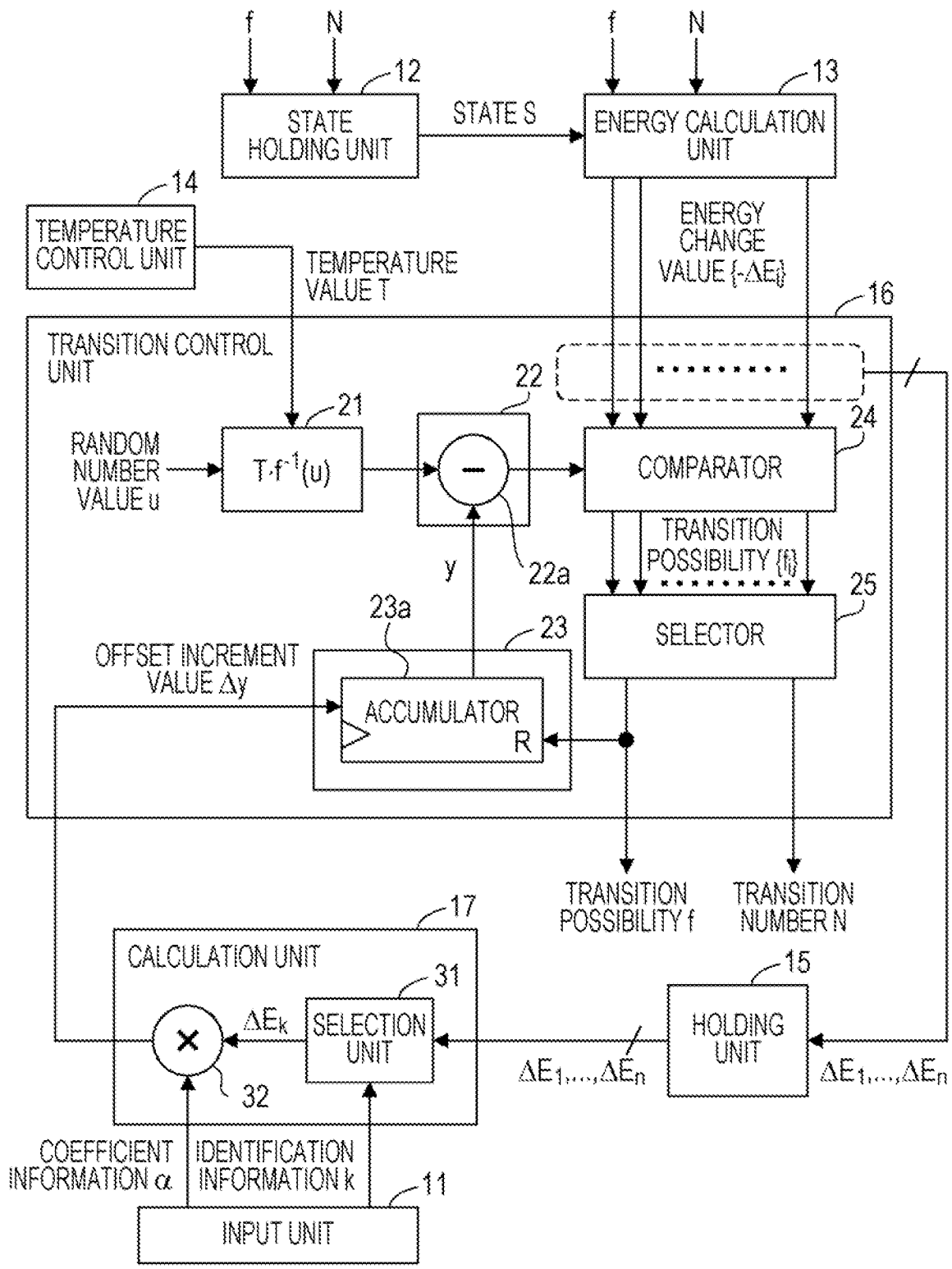
FIG. 1 is a diagram illustrating an optimization device according to a first embodiment.

FIG. 1 is a diagram illustrating an optimization device according to a first embodiment.

An optimization device 10 obtains a solution to a combinatorial optimization problem by simulated annealing. The simulated annealing is one kind of the Monte Carlo method and is a method of stochastically obtaining a solution with random number values. A problem of minimizing a value of an energy function to be optimized will be described below as an example. In a case of maximization, the sign of the energy function may be changed. The energy function may be called as an evaluation function, a cost function, or an objective function.

A state transition of starting from an initial state in which one discrete value is assigned to each variable and selecting a state (for example, state of being changed by one variable) close to the current state (combination of variable values) from the current state is considered. An energy change with respect to the state transition is calculated. Then, it is stochastically determined whether to change the state by adopting the state transition or to maintain the original state without adopting the state transition, in accordance with the calculated energy change value. If an adoption probability in a case where energy decreases is selected to be higher than that in a case where the energy increases, the state is changed on average in a direction in which the energy decreases, and thus it is possible to expect that the state transitions to a more appropriate state with time. An optimal solution or an approximate solution that gives energy close to the optimal value may be obtained. If this is deterministically set to be adopted in a case where the energy decreases and set not to be adopted in a case where the energy increases, the energy change monotonically decreases with respect to time. However, once the local solution is reached, no further change occurs. Since a large number of local solutions are provided in the optimization problem, the state is trapped to a local solution without being very close to the optimal value. Thus, it is important to stochastically determine whether or not to adopt the state transition.

In simulated annealing, it is proved that the state reaches the optimal solution at the limit of infinite time (number of iterations) if the adoption (acceptance) probability of the state transition is determined as follows.

For the energy change value (−ΔE) by the state transition, the acceptance probability p of the state transition is determined by any of the following functions f( )

$$p(\Delta E, T) = f\left(-\frac{\Delta E}{T}\right) \quad (1)$$

$$f_{metro}(x) = \min(1, e^x) \quad (2)$$

$$f_{Gibbs}(x) = \frac{1}{1+e^{-x}} \quad (3)$$

T is a parameter called as a temperature value and is represented in Expression 4. That is, the temperature value T is reduced logarithmically with respect to the number t of iterations.

$$T = \frac{T_0 \log(c)}{\log(t+c)} \quad (4)$$

It is desirable that T0 be an initial temperature value and be sufficiently high in accordance with a problem.

In a case of using the acceptance probability represented by Expressions (1) and (2) (or (1) and (3)), if a normal state is reached after sufficient iteration, an occupancy probability of each state follows the Boltzmann distribution for a thermal equilibrium state in thermodynamics. Since the occupancy probability of a low energy state increases if the temperature gradually decreases from the high temperature, the low energy state is obtained if the temperature sufficiently decreases. Since the behavior is similar to a state change when annealing the material, the method is called simulated annealing. At this time, a case where the state transition in which energy increases probabilistically occurs corresponds to thermal excitation in physics.

As described above, in simulated annealing, if the number of iterations is infinite, the optimum solution may be obtained. However, since, in practice, it is required to obtain a solution with a finite number of iterations, it is not possible to reliably obtain the optimum solution. Since, in the above expression, the temperature decreases very slowly, the temperature does not decrease sufficiently in a finite time. Thus, in practical simulated annealing, the temperature decreases more quickly than a logarithmic temperature change, in many cases.

In the following descriptions, a case where a plurality of candidates for the state transition is generated will be described. However, in original basic simulated annealing, a transition candidate is generated one by one, and a function as follows may be applied in a case where the transition candidate is generated one by one. Descriptions will be made on the assumption that all state variables are set as candidates for the state transition. However, only some of the state variables may be set as candidates for the state transition.

The optimization device 10 is, for example, a one-chip semiconductor integrated circuit and is realized using a field-programmable gate array (FPGA) or the like. The optimization device 10 includes an input unit 11, a state holding unit 12, an energy calculation unit 13, a temperature control unit 14, a holding unit 15, a transition control unit 16, and a calculation unit 17. The optimization device 10 may be called as a processor.

The input unit 11 is configured to input identification information and coefficient information. The identification information is used to select a change value of an energy value in the calculation unit 17. The identification information is indicated by k. The identification information k is an integer which is equal to or greater than 1 and is smaller than the number of a plurality of state variables. The coefficient information is used to calculate an offset increment value in the calculation unit 17. The coefficient information is indicated by $\alpha$. $\alpha$ is a real number of $0<|\alpha|<1$. In this example, as an example, it is assumed that $0<\alpha<1$.

The state holding unit 12 holds the current state S (values of a plurality of state variables).

In a case where a state transition occurs by changing any of the values of the plurality of state variables, the energy calculation unit 13 calculates a change value of the energy value (energy change value) for each of a plurality of state transitions. The number of state variables is set to n (n is an integer of 2 or more). Information for identifying the state variable is called as an index and is indicated by i (i is an integer of 1 to n). The energy change value corresponding to the change of each of the state variables having indices i of 1 to n is indicated by $\{-\Delta E_i\}$.

The temperature control unit 14 controls the temperature value T indicating a temperature that corresponds to a noise value.

The holding unit 15 holds a plurality of energy change values $\{-\Delta E_i\}$ which are calculated by the energy calculation unit 13 and correspond to a predetermined number of state transitions, in a plurality of entries corresponding to the identification information k, respectively. For example, if the minimum value of the energy value is updated, the holding unit 15 updates an energy change value by the energy change value $\{-\Delta E_i\}$ corresponding to a state transition in which values (states) of the plurality of state variables at the minimum value are set as a transition source. The sign of the value held by the holding unit 15 may be reversed depending on a circuit configuration. For example, the holding unit 15 may hold the energy change value $\{\Delta E_i\}$. In the example in FIG. 1, the sign of a is positive, and an offset adder circuit 22 described later is realized by a subtractor 22a configured to perform subtraction for thermal excitation energy. Thus, the holding unit 15 holds the energy change value $\{\Delta E_i\}$.

Regarding state transition occurring from a state where the energy has the relative minimum value, $\Delta E_i>0$ is satisfied. That is, a state (local solution) in which the energy has the relative minimum value is referred to as a state where the energy increases with respect to a change of any state variable.

The transition control unit 16 stochastically determines whether or not any of a plurality of state transitions is accepted, by a relative relation between the energy change value $\{-\Delta E_i\}$ and the thermal excitation energy based on the temperature value T, the energy change value $\{-\Delta E_i\}$, and the random number value.

The calculation unit 17 calculates the offset increment value based on the energy change value $\{-\Delta E_i\}$ (as described above, may be energy change value $\{\Delta E_i\}$) held by the holding unit 15, and supplies the offset increment value to the transition control unit 16. The calculation unit 17 may be realized by a general purpose processor (arithmetic operation unit) such as a central processing unit (CPU) or may be realized by a dedicated electronic circuit.

An operation example in one iteration by the optimization device 10 is as follows. Firstly, the transition control unit 16 generates one or a plurality of candidates for a state transition from the current state S held by the state holding unit 12 to the next state. The energy calculation unit 13 calculates an energy change value $\{-\Delta E_i\}$ for each of the state transitions exemplified as the candidates, by using the current state S and the candidates for the state transition. The transition control unit 16 permits the state transition with permission probabilities (acceptance probabilities) of Expressions (1) and (2) or Expressions (1) and (3) in accordance with the energy change value $\{-\Delta E_i\}$ of each state transition, by using the temperature value T generated by the temperature control unit 14 and a random variable (random number value) generated by a random number generation unit (not illustrated) in the optimization device 10. The transition control unit 16 outputs a transition possibility $\{f_i\}$ indicating whether or not each state transition is accepted (may be referred to as a transition possibility below). In a case where a plurality of permitted state transitions is provided, the transition control unit 16 randomly selects one thereof by using the random number value. The transition control unit 16 outputs a transition number N and the transition possibility f of the selected state transition. In a case where the permitted state transition is provided, the value of the state variable stored in the state holding unit 12 is updated in accordance with the adopted state transition.

When starting from the initial state, the iteration repeats while the temperature control unit 14 decreases the temperature value, and the number of iterations reaches a predetermined value, or when an end determination condition, for example, the energy is lower than a predetermined value, is satisfied, the operation ends. An answer output by the optimization device 10 is a state at the end. In practice, the temperature value does not become 0 in a finite number of iterations. Thus, the state occupancy even at the end has a distribution represented by a Boltzmann distribution or the like, and is not necessarily an optimal value or a favorable solution. Thus, a realistic solution is to cause the energy obtained so far in the middle of iteration to hold the lowest state and finally to output the lowest state.

A mechanism of permitting a state transition with the permission probability represented by Expressions (1) to (3) will be described.

A circuit that outputs 1 with the permission probability p and outputs 0 with the permission probability (1-p) may be realized in a manner that the permission probability p is input to an input A of a comparator that has two inputs A and B, outputs 1 at time of A>B, and outputs 0 at time of A≤B, and a uniform random number having a value of an interval [0, 1) is input to the input B. Thus, if the value of the permission probability p calculated with Expression (1) by the energy change value and the temperature value T is input to the input A of the comparator, it is possible to realize the above function.

That is, when f is set to a function used in Expression (1), and u is set to a uniform random number having a value of an interval [0, 1), it is possible to realize the above function by a circuit that outputs 1 when $f(\Delta E/T)$ is greater than u.

Such a configuration may be made, and it is possible to realize the same function even when a modification as follows is made. Even when the same monotonically increasing function acts on two numbers, a magnitude relationship does not change. Therefore, even when the same monotonically increasing function acts on two inputs of the comparator, the output does not change. It is understood that, if an inverse function $f^{-1}$ of f is employed as the monotonically increasing function, the above function may be realized by a circuit that outputs 1 when $-\Delta E/T$ is greater than $f^{-1}(u)$. Since the temperature value T is positive, the above function may be realized by a circuit that outputs 1 when $-\Delta E$ is greater than $Tf^1(u)$. The optimization device 10 has a conversion table (not illustrated) for realizing the inverse function $f^{-1}(u)$. The conversion table is a table for outputting a value of a function in the following Expression (5) or (6) with respect to an input in which the interval [0, 1) is discretized.

$$f_{metro}^{-1}(u) = \log(u) \qquad (5)$$

$$f_{Gibbs}^{-1}(u) = \log\left(\frac{u}{1-u}\right) \qquad (6)$$

In a case where the state transition does not occur by the above determination, the transition control unit 16 adds the offset value to the energy change value $\{-\Delta E_i\}$ to provide a function to accelerate the state transition. In particular, the transition control unit 16 adaptively determines the offset value by using the offset increment value supplied by the calculation unit 17.

The transition control unit 16 includes a thermal excitation energy generation unit 21, an offset adder circuit 22, an offset control circuit 23, a comparator 24, and a selector 25. A state machine that generates a latch configured to hold a determination result and the like and a timing is also provided in the transition control unit 16. However, FIG. 1 does not illustrate the state machine for simple illustration.

The thermal excitation energy generation unit 21 has a conversion table for converting a random number value (uniform random number) u for each transition candidate into a value of the above-described inverse function $f^{-1}(u)$, and outputs a product obtained by the converted value by the temperature value T, as thermal excitation energy in a Metropolis or Gibbs method. For example, the transition control unit 16 includes a random number generation unit (not illustrated) that generates the random number value u. The random number generation unit may generate an individual random number value for each transition candidate or may generate a common random number for the transition candidates. The random number generation unit may generate a common random number for each of a predetermined number of transition candidates.

The offset adder circuit 22 functions as an offset adder circuit that adds an offset value y to the energy change value $\{-\Delta E_i\}$ by the state transition. In the example of the circuit in FIG. 1, the offset adder circuit 22 is the subtractor 22*a*. Therefore, in the example in FIG. 1, instead of a configuration of adding the offset value y to the energy change value $\{-\Delta E_i\}$, a configuration of subtracting the offset value y from the product $Tf^{-1}(u)$ of the temperature value T and the random number value, as a comparison target may be made. The subtractor 22*a* subtracts the offset value y common between all candidates for the state transition, from the thermal excitation energy.

The offset control circuit 23 controls addition of the offset increment value $\Delta y$ to the offset value y. The offset control circuit 23 sets an initial value of the offset value y to 0. In the example in FIG. 1, the offset control circuit 23 is an accumulator 23*a* having a reset terminal R. The accumulator 23*a* sets the offset value y to 0 when the transition possibility f to be input to the reset terminal R indicates that the state transition is permitted (that is, when the state transition occurs). The accumulator 23*a* has an input terminal and a clock terminal. When the transition possibility f indicates that the state transition is not permitted (that is, when the state transition does not occur), a pulse signal (not illustrated) is input to the clock terminal of the accumulator 23*a*, and the accumulator 23*a* adds the input offset increment value $\Delta y$ to the offset value y.

That is, in a case where none of the plurality of state transitions is accepted, the transition control unit 16 adds, to the energy change value, a value obtained by accumulating the offset value ($y=\Delta y$) a number of times proportional to a length of a period in which determination that any of the plurality of state transitions is not accepted is continuously performed (or subtracts the value from the thermal excitation energy). In a case where any of the plurality of state transitions is accepted, the transition control unit 16 sets the offset value y to 0.

The pulse signal (not illustrated) is supplied by the state machine (not illustrated), for example. The offset increment value $\Delta y$ is supplied by the calculation unit 17.

The comparator 24 outputs the transition possibility $\{f_i\}$ indicating whether or not each state transition is possible, by comparing a subtraction result output by the subtractor 22*a* and the energy change value $\{-\Delta E_i\}$ by each state transition.

When a plurality of permitted state transitions is provided, the selector 25 randomly selects one thereof based on the transition possibility $\{f_i\}$ by using the random number. The selector 25 outputs the number (transition number N) of the selected candidate for the state transition and outputs 1 as the transition possibility f. When the state transition does not occur, the transition possibility f has a value of 0. The transition number N and the transition possibility f are supplied to the state holding unit 12 and the energy calculation unit 13.

Next, a calculation method of the offset increment value $\Delta y$ by the calculation unit 17 will be described. The calculation unit 17 includes a selection unit 31 and a multiplier 32.

The selection unit 31 selects an energy change value $\Delta E_k$ from $\{\Delta E_i\}$ held by the holding unit 15, based on identification information k input by the input unit 11.

The multiplier 32 sets a result obtained by multiplying the energy change value $\Delta E_k$ by coefficient information $\alpha$ input by the input unit 11, to be an offset increment value $\Delta y$. Specifically, $\Delta y = \max(0, \alpha \times \Delta E_k)$. The max (a, b) operation is an operation of selecting the larger one of (a, b). The reason for setting $\Delta y$ to be equal to or greater than 0 by the max operation is that, in a case of $\Delta E_k < 0$, it is considered that the energy change value does not stay in the local solution, and adjustment of a transition probability is not required. The multiplier 32 supplies the offset increment value $\Delta y$ to the accumulator 23*a*.

The identification information k is, for example, an integer of 1 or more and is the number of state variables desired to have a transition probability of 1 by offset. $\Delta E_k$ indicates the k-th smallest value when $\{\Delta Ei\}$ is sorted in ascending order from the smallest. For example, when the number of state variables is 1024 (n=1024), k is set to 10 in a case where the transition probability is desired to have 1 at a proportion of 1%.

The coefficient information $\alpha$ is a value for designating the number of offset increments from the local solution to set the transition probability to 1 for the state variables having the above proportion. As described above, in this example, the coefficient information $\alpha$ is a real number of $0 < \alpha < 1$. In order not to have a large influence on the branching ratio of the state transition, it is considered that the average stay time in the local solution is to be several times the average stay time when it is not in the local solution. A case the average stay time when it is not in the local solution is a required time of the one iteration, for example, α=0.1 or α=0.3 is considered.

As described above, the calculation unit 17 selects a change value $\Delta E_k$ corresponding to the k-th smallest value of the absolute values of the energy change value $\{\Delta E_i\}$ held by the holding unit 15 and calculates the offset increment value $\Delta y$ by multiplying the selected $\Delta E_k$ by the coefficient information α. Since the initial value of the offset value y is 0, the offset value y after the first update is $\Delta y$.

The calculation unit 17 acquires the change value $\{\Delta E_i\}$ held by the holding unit 15 and updates the offset increment value (offset value to be firstly added when falling into a local solution), every time determination of whether or not the state transitions for the plurality of state variables is performed a predetermined number of times. This is because $Tf^{-1}(u)$ changes with the decrease of the temperature, and the acceptance probability of each state transition also changes.

A determination threshold $(Tf^{-1})$ compared with the energy change value $\{-\Delta E_i\}$ will be described.

FIG. 2 is a diagram illustrating an example of the determination threshold compared with the energy change value.

A case of applying a Metropolis method as an example is considered. In this case, a relation between a transition acceptance probability $A=p(\Delta E, T)$ and an energy increment $\Delta E$ from Expressions (1) and (2) is represented by a graph 41. A horizontal axis in the graph 41 indicates the energy increment $\Delta E$, and a vertical axis indicates the transition acceptance probability A. According to the graph 41, A=1 in a case where the energy decreases (case of $\Delta E \leq 0$). In a case where the energy increases (case of $\Delta E \leq 0$), the transition acceptance probability $A=A(\Delta E)$. As described above, the comparator 24 illustrated in FIG. 1 performs comparison by results obtained by applying an inverse function $f^{-1}$ being a monotonically increasing function to both hand sides of Expressions (1) and (2). According to Expression (5), the determination threshold for the uniform random number u $(Tf^{-1}(u)=T\times\log(u))$ is represented by a graph 42. A horizontal axis in the graph 42 indicates the uniform random number u, and a vertical axis indicates the determination threshold $Tf^{-1}$.

In a case considering the offset value y, in a case where a relation of the following Expression (7) or (8) is provided between the energy change value $\{-\Delta E_i\}$ and the determination threshold $Tf^{-1}(u)$, a change of the state variable having an index i is permitted. FIG. 1 illustrates an example in which the relationship of Expression (7) is evaluated, and the transition possibility $\{f_i\}$ is output, by the comparator 24.

$$T \cdot \log(u) - y < -\Delta E \qquad (7)$$

$$T \cdot \log(u) < -\Delta E + y \qquad (8)$$

Next, the transition acceptance probability in the local solution will be described.

Figure 3:
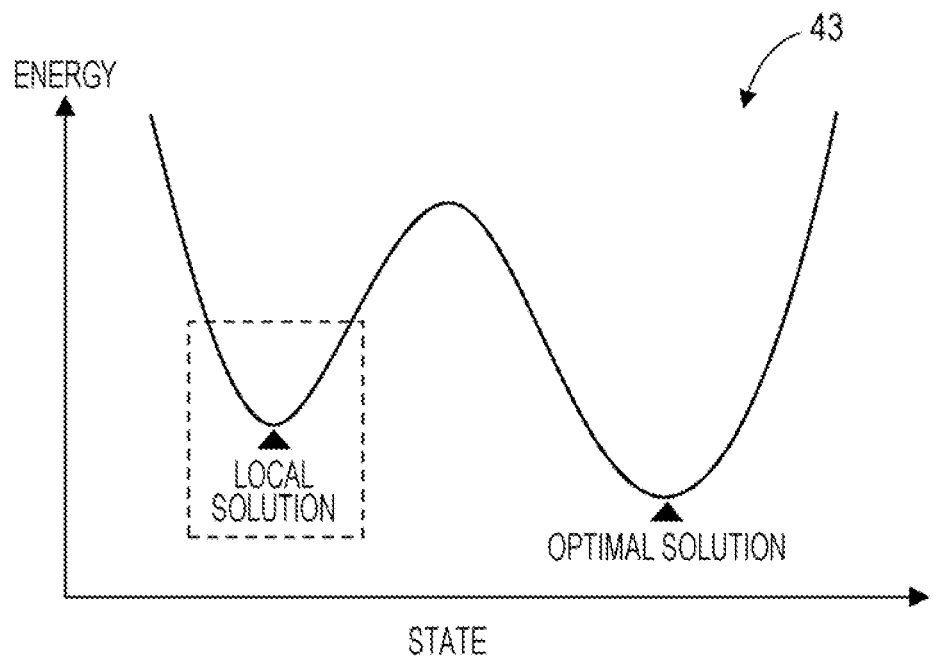
FIG. 3 is a diagram illustrating an example of an energy distribution in accordance with a state.

FIG. 3 is a diagram illustrating an example of an energy distribution in accordance with the state.

A graph 43 represents a relation of the energy to a state represented by each state variable. A horizontal axis in the graph 43 indicates the state, and a vertical axis indicates the energy. In the graph 43, a state (local solution) in which the energy is not the minimum but the relative minimum value is represented in addition to a state (optimal solution) where the energy is the minimum.

With the above-described Expressions (1) to (3), as the temperature becomes lower, or as the energy change value (positively) increases, the acceptance probability of the state transition is reduced.

In the optimization device 10, as one of the main causes of long execution time of an operation, a point that the temperature is required to sufficiently decrease in order to set the optimal solution to be in a stable state, but the escape from the local solution occurs much less frequently (acceptance probability of the state transition is low) is exemplified.

Figure 4:
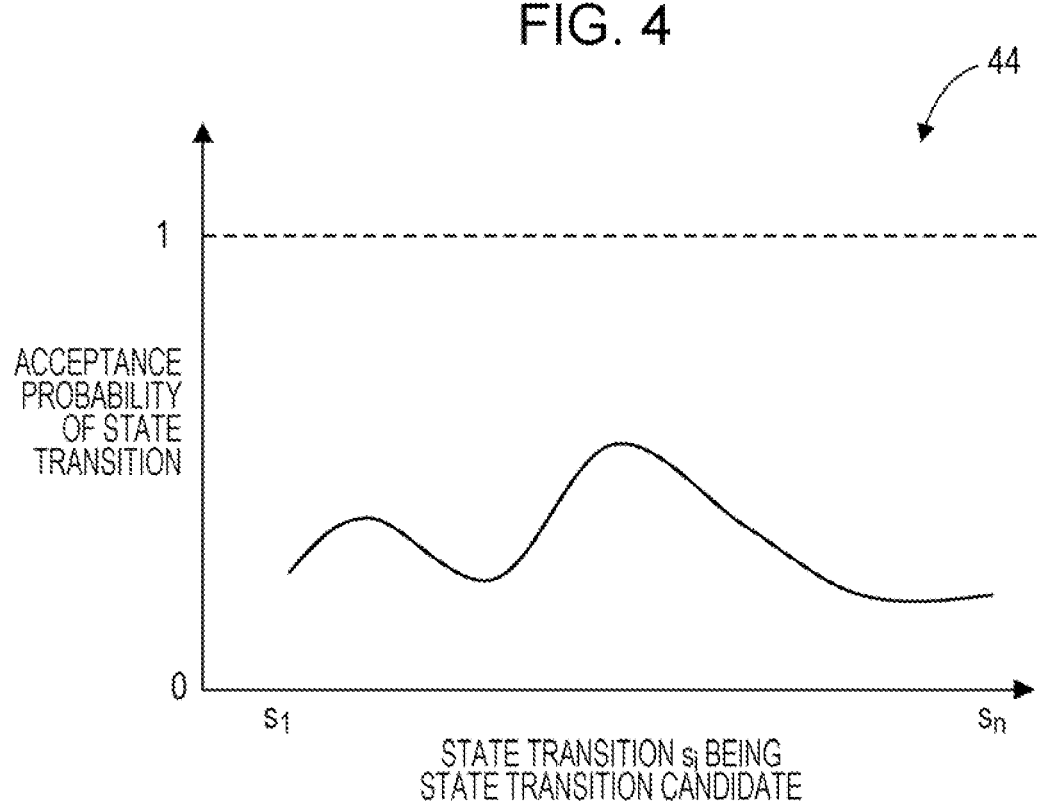
FIG. 4 is a diagram illustrating an example of an acceptance probability of a state transition of one hamming distance in a local solution.

FIG. 4 is a diagram illustrating an example of the acceptance probability of the state transition of one hamming distance in the local solution.

A graph 44 indicates the acceptance probability of the state transition at one hamming distance for a state transition s, being a state transition candidate in the local solution. A horizontal axis in the graph 44 indicates the state transition s, being a state transition candidate, and a vertical axis indicates the acceptance probability of the state transition.

A waveform of the graph 44 indicates that the acceptance probability of each state transition in the local solution is much less than 1. Therefore, a possibility of the state transition occurring is low, and it takes time to escape from the local solution.

Thus, the optimization device 10 accelerates the escape from the local solution by using the offset value y. In particular, the optimization device 10 adaptively determines the offset increment value, and thus suppresses deterioration of the accuracy of the solution and speeds up the calculation.

Figure 5A:
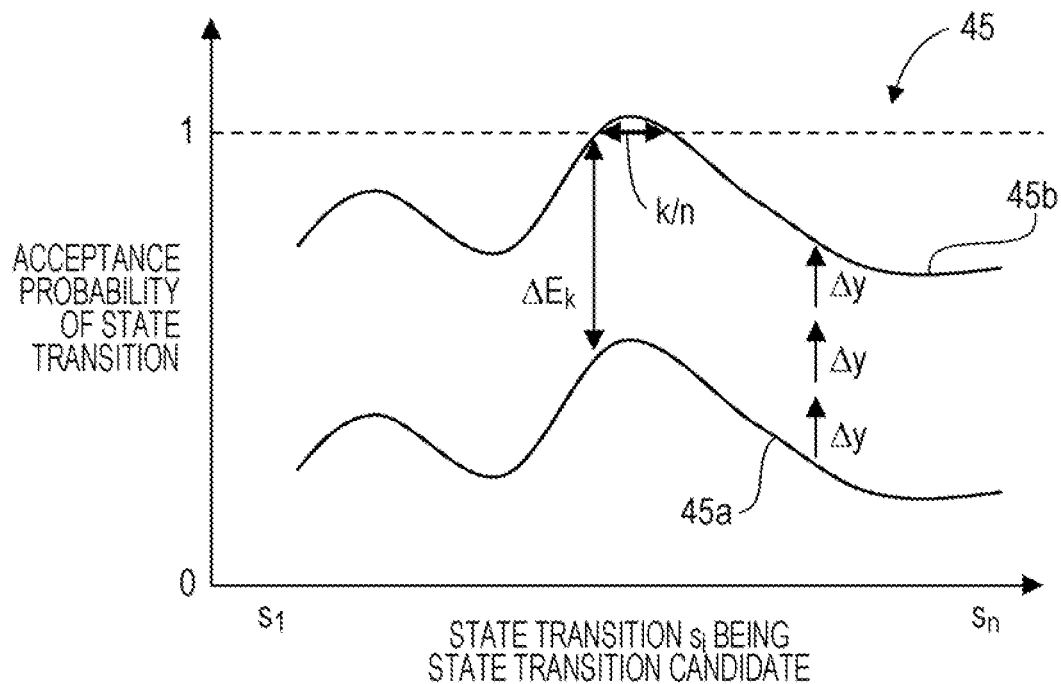
FIGS. 5A and 5B are diagrams illustrating an example of an offset increment value.
Figure 5B:
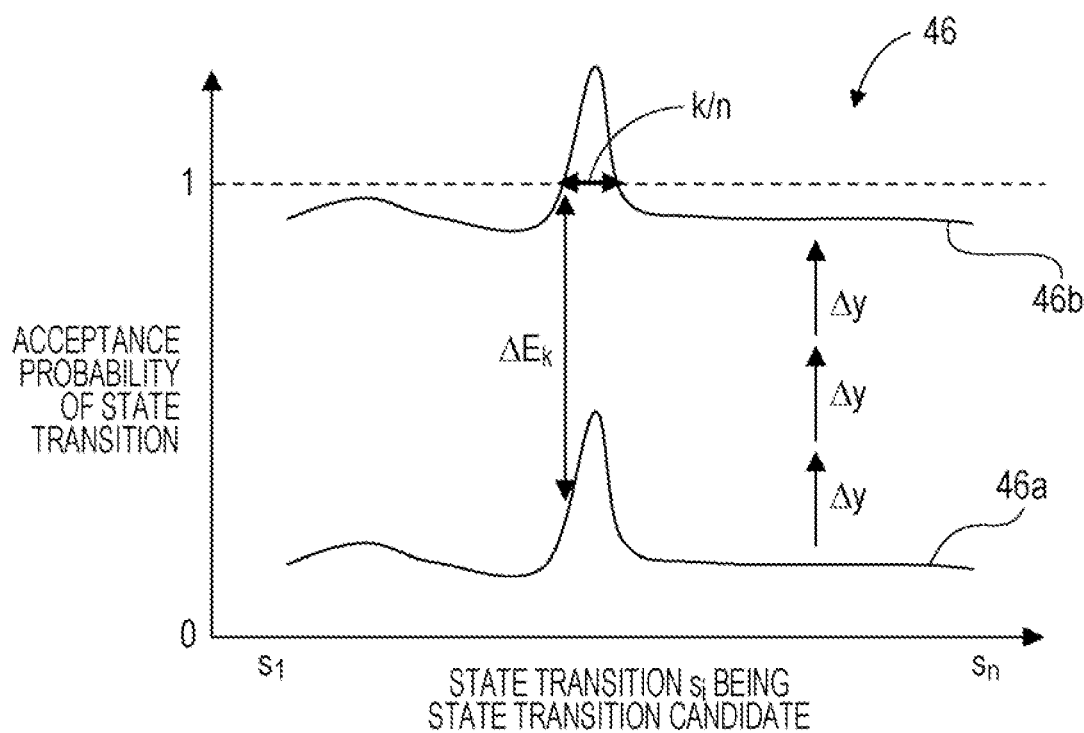

FIGS. 5A and 5B are diagrams illustrating an example of the offset increment value.

FIG. 5A illustrates a graph 45. FIG. 5B illustrates a graph 46. A horizontal axis in the graphs 45 and 46 indicates the state transition $s_i$ being the state transition candidate, and a vertical axis indicates the acceptance probability of the state transition.

As described above, the identification information k is determined in accordance with a proportion (or the number) of the state variables desired to be allowed to transition, by using the offset value. The coefficient information α is 0.33, for example.

At this time, in the example in FIG. 5A, in a case where $\Delta y$ as the offset value y is added to the energy change value $\{-\Delta E_i\}$ three times, it is expected that an acceptance probability indicated by a waveform 45a is an acceptance probability indicated by a waveform 45b. In the waveform 45b, the proportion of the state variables having a transition probability of 1 is expected to be about k/n.

Similarly, in the example in FIG. 5B, in a case where $\Delta y$ as the offset value y is added to the energy change value $\{-\Delta E_i\}$ three times, it is expected that an acceptance probability indicated by a waveform 46a is an acceptance probability indicated by a waveform 46b. In the waveform 46b, the proportion of the state variables having a transition probability of 1 is expected to be about k/n.

As described above, even though the waveform representing the acceptance probability has a peak, it is possible to cause state transition candidates corresponding to a predetermined proportion to have a transition probability of 1 by offset increments of which the number corresponds to the coefficient information α.

Figure 6A:
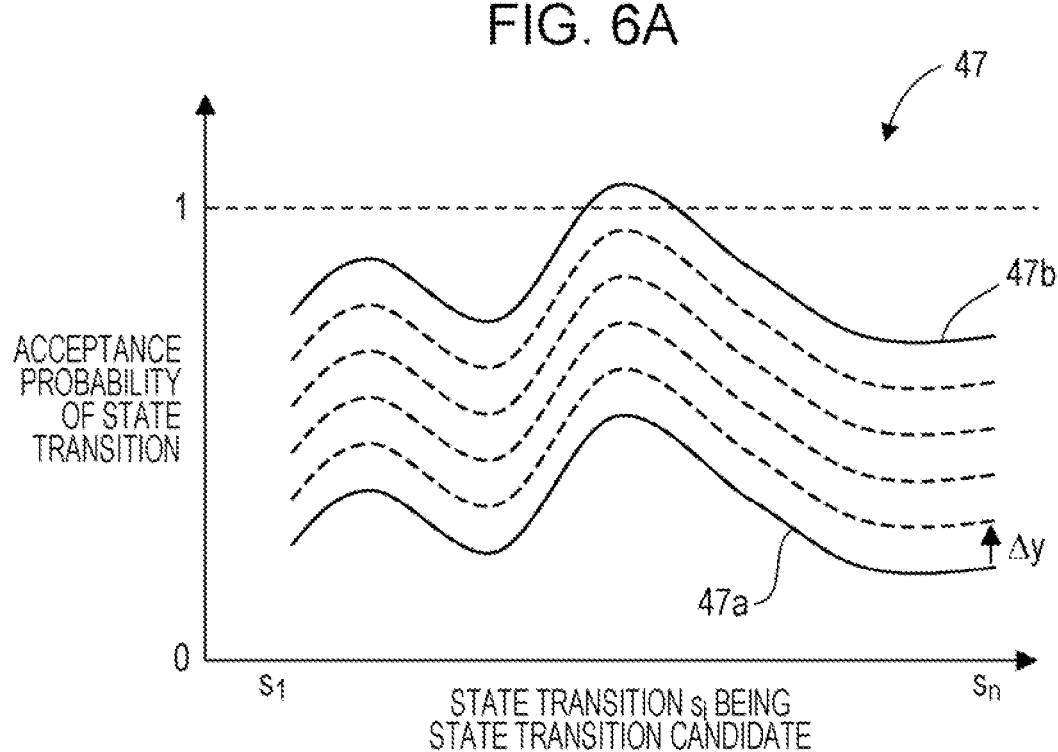
FIGS. 6A and 6B are diagrams illustrating comparative examples of the offset increment value.
Figure 6B:
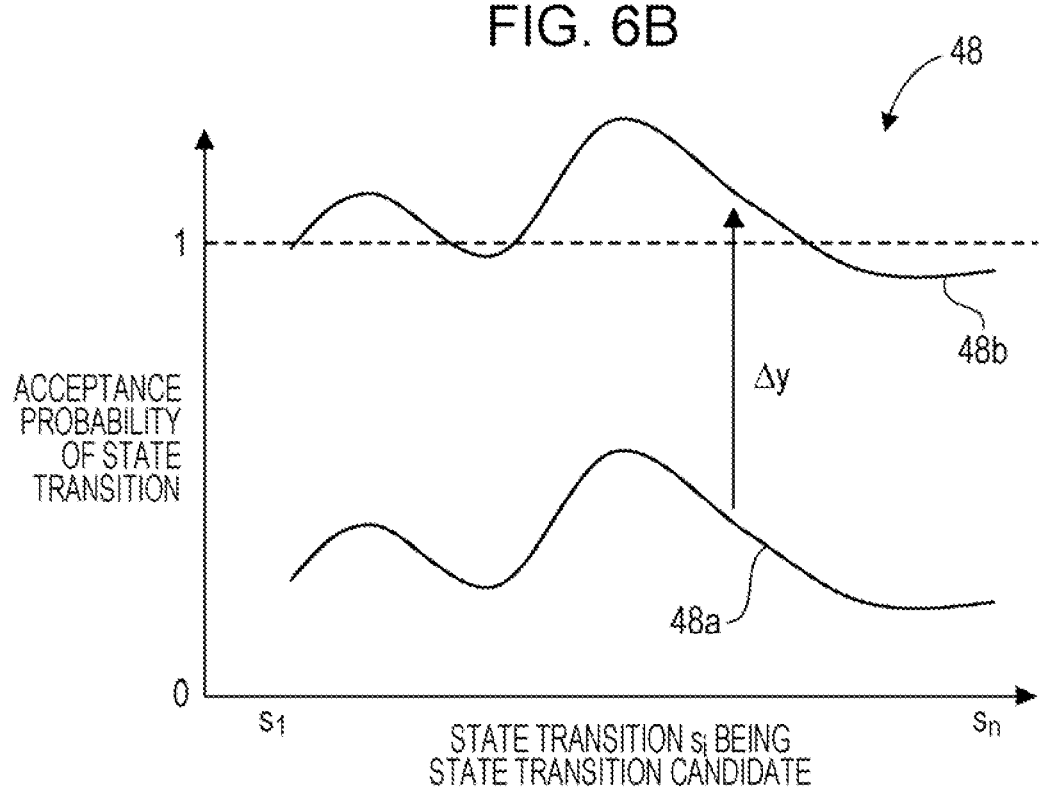

Next, a comparative example of the offset increment value will be described. FIGS. 6A and 6B are diagrams illustrating comparative examples of the offset increment value. FIG. 6A illustrates a graph 47 in a case where the offset increment value is too small. FIG. 6B illustrates a graph 48 in a case where the offset increment value is too large. A horizontal axis in the graphs 47 and 48 indicates the state transition si being the state transition candidate, and a vertical axis indicates the acceptance probability of the state transition.

As illustrated by the graph 47, if the offset increment value $\Delta y$ is too small, it takes a lot of time to escape from the local solution, and thus it is not possible to sufficiently increase the speed of the calculation of the optimization device 10. Specifically, as the offset increment value $\Delta y$ becomes smaller, the number of offset increments until an acceptance probability indicated by a waveform 47a becomes an acceptance probability indicated by a waveform 47b increases. Therefore, a stay time in the local solution becomes longer, and the calculation of the optimization device 10 becomes slow.

As illustrated by the graph 48, if the offset increment value $\Delta y$ is too large, a possibility of a state transition that causes a relatively large increase in energy increases excessively. Specifically, if the offset increment value $\Delta y$ is too large, an acceptance probability indicated by a waveform 48a rapidly increases up to an acceptance probability indicated by a waveform 48b rapidly. If the acceptance probability increases rapidly, even though, originally, the acceptance probability of the state transition in which an increase in energy is relatively small even in the local solution is required to become high, the offset value y becomes large before a state transition in which an increase in energy is relatively small is provided as a candidate. That is, as indicated by the waveform 48b, a difference of the acceptance probability of the state transition for each energy change is reduced. As a result, the branching ratio from one state to another state deviates from an appropriate branching ratio in simulated annealing, and the accuracy of the solution is degraded.

On the other hand, the optimization device 10 obtains the offset increment value $\Delta y$ from the features of the local solution based on the identification information k, the coefficient information $\alpha$, and the energy change value held by the holding unit 15. Thus, it is possible to obtain the offset value y by appropriate $\Delta y$ for each problem without user intervention, Since the offset increment value $\Delta y$ is calculated based on the k-th value counted from the smallest of the energy change value $\{\Delta E_i\}$, it is possible to increase the transition probability of a predetermined proportion of bits to 1 by a predetermined number of offset increments. Therefore, it is possible to suitably adjust the offset value y so as not to be too small and not to be too large. As a result, it is possible to increase the speed of the calculation while suppressing deviation of the branching ratio of the state and suppressing deterioration in accuracy of the solution.

Regarding simulated annealing in a case where optimized energy is represented by an Ising model, generation of the transition candidate and a calculation method of the energy change by the state transition will be simply described below.

The Ising model is a model representing a system of n spins that interact with each other, and each spin (corresponding to the state variable) $x_i$ takes a binary value of 0 or 1. The energy in the system is represented by the following Expression (9). Expression (9) is an example of an evaluation function.

$$E(x) = -\sum_{\langle i,j \rangle} W_{ij} x_i x_j - \sum_i b_i x_i \tag{9}$$

In Expression (9), $W_{ij}$ indicates an interaction coefficient between a spin $x_i$ and a spin $x_j$, and $b_i$ indicates an external magnetic field coefficient being a bias value of the system. $W_{ij}$ and $b_i$ are integers determined in accordance with a problem desired to be solved.

Candidates for the state transition from the current state to the next state are one spin reversal, and n candidates are provided. Thus, a one spin number or a set of a plurality of spin numbers to be reversed may be generated as the transition candidate.

An energy change by the i-th spin reversal is represented by the following Expression (10).

$$\begin{aligned} \Delta E_i &= E(x)|_{x_i \to 1-x_i} - E(x) \\ &= -\Delta x_i \left( \sum_j W_{ij} x_j + b_i \right) \\ &= -\Delta x_i h_i \\ &= \begin{cases} -h_i & (\text{for } x_i = 0 \to 1) \\ +h_i & (\text{for } x_i = 1 \to 0) \end{cases} \end{aligned} \tag{10}$$

$h_i$ is represented by Expression (11). $h_i$ is called as a local field value and represents the ratio of the energy change by reversal of each spin.

$$h_i = \sum_j W_{ij} x_j + b_i \tag{11}$$

Since it is determined whether or not the state transition is performed, by the energy change, basically, the energy change may be calculated from the local field value without calculating the energy itself. In a case using a state for the lowest energy obtained as an output, it is possible to obtain the energy by calculating the energy change from the local field value, and accumulating the calculation result.

Further, since $$\frac{\partial}{\partial x_j} h_i = W_{ij}, \tag{12}$$

it is not required to recalculate the local field value every time by a matrix operation, and the local field value may be added by a change by a spin reversed by the state transition. A conversion amount by the spin reversed by the state transition is represented by Expression (13), for example.

$$\Delta h_i = \begin{cases} +W_{ij} & (\text{for } x_j = 0 \to 1) \\ -W_{ij} & (\text{for } x_j = 1 \to 0) \end{cases} \tag{13}$$

Therefore, the state holding unit 12 or the energy calculation unit 13 illustrated in FIG. 1 may be realized using an n-bit register that holds n spin values, an adder, and a relatively simple arithmetic circuit such as an exclusive OR.

In simulated annealing, only one state variable changes with the state transition, and the energy change value for the state variable may be calculated in advance by using the local field value. FIG. 1 illustrates a configuration in which the energy change value $\{-\Delta E_i\}$ for each state variable is obtained, and the transition possibility $\{f_i\}$ is determined in parallel for each state variable, and one thereof is selected. A configuration in which one of energy change values which have been calculated in advance is selected corresponding to generation of the transition candidate, and the transition possibility f is determined may be made. When parallelism is set to g in the former configuration of determining the transition possibility $\{f_i\}$ in parallel, in the former configuration, it is possible to increase the state transition probability in one iteration by about g times in comparison to the latter configuration of selecting one energy change value.

When the machine is not a Boltzmann machine, transitions in which a plurality of state variables change may be considered, and thus an implementation for calculating a required energy change value after generation of a transition candidate may be advantageous.

Second Embodiment

Figure 7:
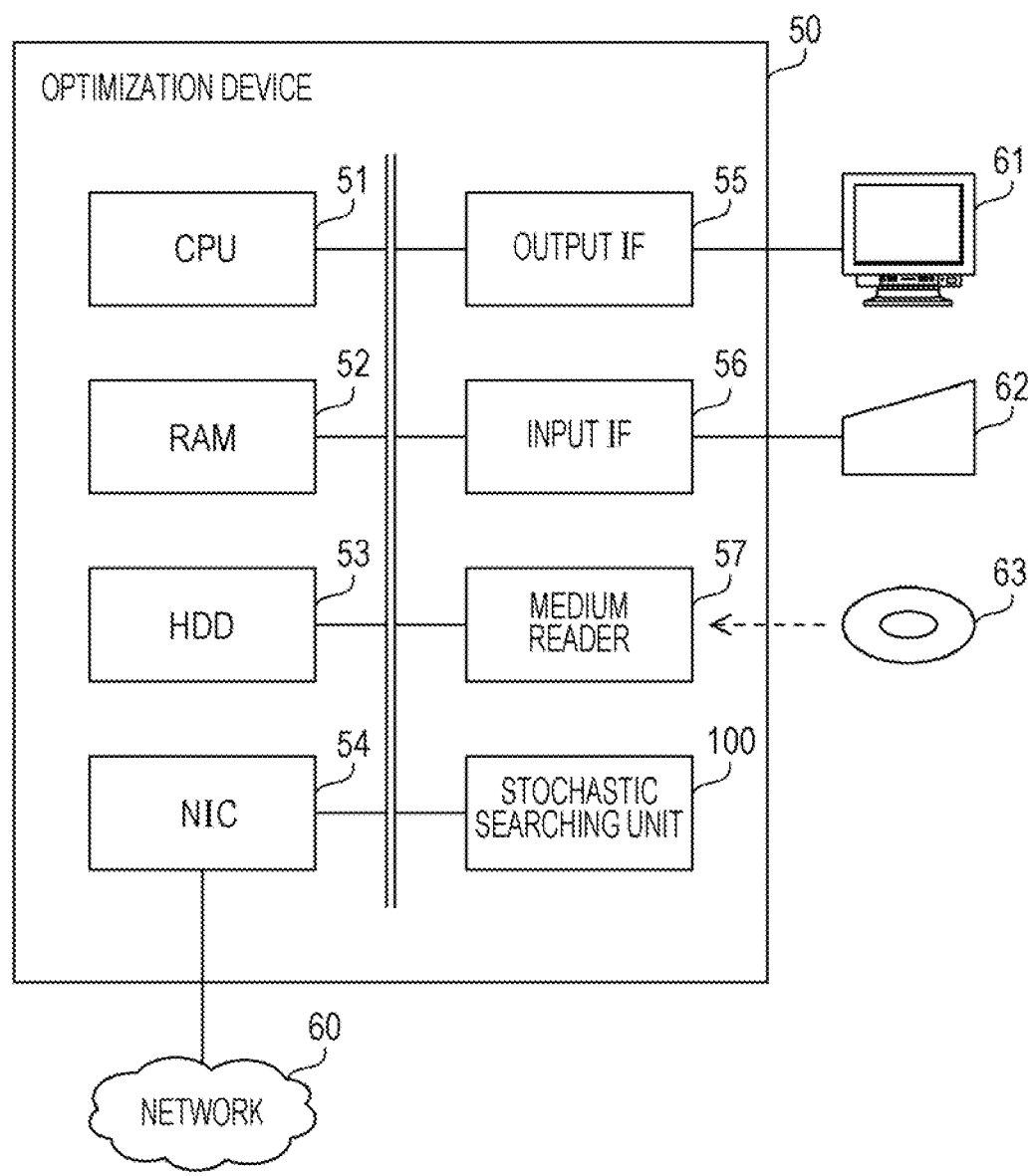
FIG. 7 is a diagram illustrating a hardware example of an optimization device according to a second embodiment.

Next, a second embodiment will be described. FIG. 7 is a diagram illustrating a hardware example of an optimization device according to a second embodiment.

An optimization device 50 obtains a solution of a combinatorial optimization problem by replacing the combinatorial optimization problem with a problem of obtaining a ground state of an Ising model and performing calculation. In the Ising model, one state variable is represented by one bit. The bit may be referred to as a spin bit or simply a spin. The state of the Ising model is represented by a plurality of spin bits (spin bit string).

The optimization device 50 includes a CPU 51, a random-access memory (RAM) 52, a hard disk drive (HDD) 53, a network interface card (NIC) 54, an output interface (IF) 55, an input IF 56, a medium reader 57, and a stochastic searching unit 100. The CPU 51, the RAM 52, the HDD 53, the NIC 54, the output IF 55, the input IF 56, the medium reader 57, and the stochastic searching unit 100 are coupled to a bus of the optimization device 50. The bus is, for example, a Peripheral Component Interconnect Express (PCIe) bus.

The CPU 51 is a processor (arithmetic operation unit) that executes program instructions. The CPU 51 loads at least part of a program and data stored in the HDD 53 into the RAM 52 and executes the program. The program may compose two or more programs. The CPU 51 may include a plurality of processor cores. The optimization device 50 may include a plurality of processors. A set of the plurality of processors may be referred to as a "multiprocessor" or simply a "processor".

The RAM 52 is a memory as the main storage device of the optimization device 50. The RAM 52 is a volatile semiconductor memory that temporarily stores a program executed by the CPU 51 and data used for computation by the CPU 51. The optimization device 50 may include a type of memory other than the RAM, and may include a plurality of memories.

The HDD 53 is a memory as an auxiliary storage device of the optimization device 50. The HDD 53 is a non-volatile storage device that stores or temporarily holds software programs such as an operating system (OS) and application software, and data. The optimization device 50 may include another kind of auxiliary storage device such as a solid state drive (SSD), instead of or along with the HDD.

The NIC 54 is coupled to a network 60 and is an interface that communicates with another computer via the network 60. The NIC 54 is coupled to a communication device such as a switch or a router belonging to the network 60, by a cable, for example.

The output IF 55 outputs an image to a display 61 coupled to the optimization device 50 in accordance with a command from the CPU 51. As the display 61, any kind of display, for example, a cathode ray tube (CRT) display, a liquid crystal display (LCD), a plasma display, and an organic EL (organic electro-luminescence: OEL) display may be used.

The input IF 56 acquires an input signal from an input device 62 coupled to the optimization device 50 and outputs the input signal to the CPU 51. As the input device 62, for example, a pointing device such as a mouse or a touch panel, a keyboard, a remote controller, and a button switch may be used.

The medium reader 57 is a reading device that reads a program or data recorded in a recording medium 63. As the recording medium 63, for example, a magnetic disk, an optical disk, a magneto-optical disk (MO), and a semiconductor memory may be used. The Magnetic disk includes a flexible disk (FD) and an HDD. The optical disk includes a compact disc (CD) or a digital versatile disc (DVD).

The medium reader 57 copies a program or data read from the recording medium 63 to another recording medium such as the RAM 52 or the HDD 53, for example. The read program is executed by the CPU 51, for example. The recording medium 63 may be a portable recording medium or may be used to distribute the program or data. The recording medium 63 and the HDD 53 may be referred to as computer-readable recording media.

The stochastic searching unit 100 is an accelerator that performs simulated annealing by hardware. The stochastic searching unit 100 is, for example, a one-chip semiconductor integrated circuit and is realized using a FPGA or the like. The stochastic searching unit 100 receives setting information regarding an optimization problem from the CPU 51 and performs an operation on the optimization problem. The stochastic searching unit 100 outputs an operation result on the optimization problem to the RAM 52 or the HDD 53. The optimization device 50 may include a plurality of stochastic searching units 100.

The optimization device 50 may receive the setting information regarding the optimization problem from a terminal device (not illustrated) coupled to the network 60 and transmit an operation result on the optimization problem to the terminal device via the network 60.

Figure 8:
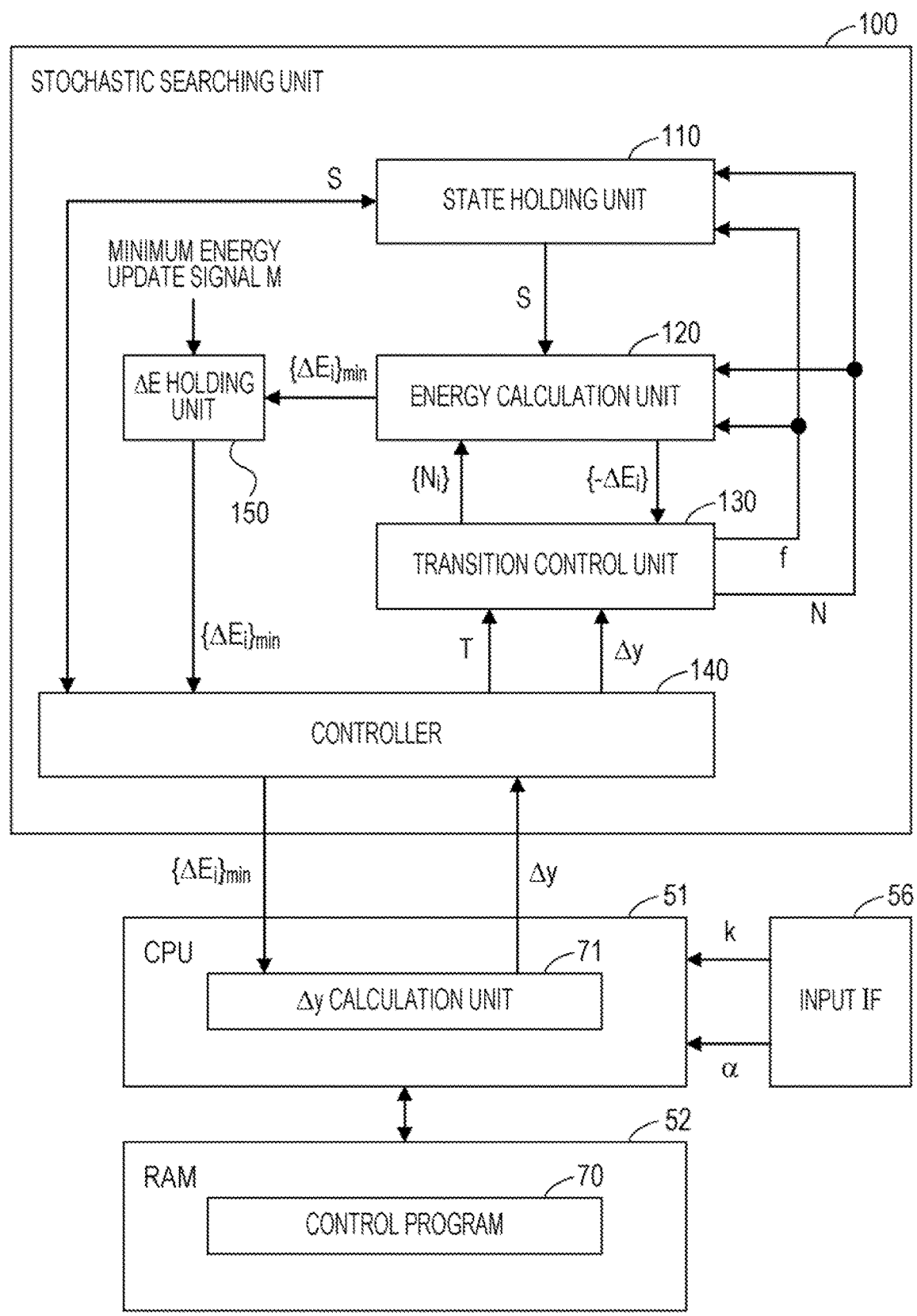
FIG. 8 is a diagram illustrating a function example of the optimization device.

FIG. 8 is a diagram illustrating a function example of the optimization device. Descriptions will be made focusing on functions of the stochastic searching unit 100 and the CPU 51 of the optimization device 50. The stochastic searching unit 100 includes a state holding unit 110, an energy calculation unit 120, a transition control unit 130, a controller 140, and a $\Delta E$ holding unit 150.

The state holding unit 110 holds the current state S. The state holding unit 110 holds the current state S (plurality of spin bits) in the Ising model.

In a case where a state transition occurs by changing any of spin bit strings indicated by the state S, the energy calculation unit 120 calculates an energy change value for each of a plurality of state transitions (candidates for the state transition). The number of spin bits is set to n (n is an integer of 2 or more). Information for identifying the spin bit is called as an index and is indicated by i (i is an integer of 1 to n). The energy change value corresponding to the change (reversal) of each of the spin bits having indices i of 1 to n is indicated by $\{-\Delta E_i\}$.

The transition control unit 130 supplies candidates $\{N_i\}$ for the state transition to the energy calculation unit 120. In this example, it is assumed that all spin bits in a spin bit string are candidates for the state transition. The transition control unit 130 stochastically determines whether or not any of a plurality of state transitions (candidates for the state transition) is accepted, by a relative relation between the energy change value $\{-\Delta E_I\}$ and the thermal excitation energy based on the temperature value T, the energy change value $\{-\Delta E_i\}$, and the random number value. The transition control unit 130 supplies the index N(transition number N) of the determined spin bit and a flag f indicating a reversal possibility to the state holding unit 110 and the energy calculation unit 120. As described later, in a case where none of spin bits is reversed (case where f indicates that reversal is not possible), the transition control unit 130 adds the offset value y to the energy change value $\{-\Delta E_i\}$ and evaluates a relative relation with the thermal excitation energy, and thereby accelerating the state transition.

The controller 140 controls an operation by the stochastic searching unit 100. Specifically, the controller 140 sets an initial value of a spin bit string in the state holding unit 110. The controller 140 sets the interaction coefficient $W_{ij}$ between spin bits and the bias value $b_i$ in the energy calculation unit 120. The controller 140 controls the temperature value T indicating a temperature to the transition control unit 130. Further, the controller 140 supplies the offset increment value $\Delta y$ to the transition control unit 130. In the second embodiment, the offset increment value $\Delta y$ is calculated by the CPU 51. The controller 140 acquires the energy change value held by the $\Delta E$ holding unit 150 and supplies the energy change value to the CPU 51. If the operation by the stochastic searching unit 100 ends, the controller 140 acquires the spin bit string in the final state from the state holding unit 110 and supplies the spin bit string in the final state, as a solution of the optimization problem, to the CPU 51.

The $\Delta E$ holding unit 150 holds a plurality of energy change values $\{-\Delta E_i\}$ which are calculated by the energy calculation unit 120 and correspond to a predetermined number of state transitions, in a plurality of entries corresponding to the identification information, respectively. For example, the $\Delta E$ holding unit 150 holds a plurality of energy change values $\{-\Delta E_i\}$ by state transitions from the lowest energy state among states obtained in a period from a start of the operation to a predetermined timing in the operation, during the operation of a certain optimization problem. The sign of the value held by the $\Delta E$ holding unit 150 may be reversed depending on a circuit configuration. In the example in FIG. 8, regarding a circuit configuration of the transition control unit 130 described later, the $\Delta E$ holding unit 150 holds the energy change value $\{\Delta E_i\}$.

Specifically, a signal M (minimum energy update signal M) indicating that the minimum energy for the state S is updated is input to the $\Delta E$ holding unit 150. The $\Delta E$ holding unit 150 holds the energy change value (represented by $\{\Delta E_i\}_{min}$) calculated by the energy calculation unit 120 when the minimum energy update signal M is input.

For example, the minimum energy obtained for the state in the Ising model may be held by the controller 140. The energy obtained for the state in the Ising model may be calculated by Expression (9). If the minimum energy calculated by Expression (9) is updated, the controller 140 may supply the minimum energy update signal M to the $\Delta E$ holding unit 150. Alternatively, the stochastic searching unit 100 may further include a minimum energy holding unit (not illustrated in FIG. 8) that holds the minimum energy calculated by Expression (9). The minimum energy holding unit may supply the minimum energy update signal M to the $\Delta E$ holding unit 150 in accordance with the update of the minimum energy.

The CPU 51 executes a control program 70 of the optimization device 50, which has been stored in the RAM 52 so as to exhibit the function of a $\Delta y$ calculation unit 71. The $\Delta y$ calculation unit 71 receives an input of the identification information k and the coefficient information $\alpha$ by the input IF 56. The identification information k is an integer of $1 \le k < n$. The coefficient information $\alpha$ is a real number of $0 < \alpha < 1$.

The $\Delta y$ calculation unit 71 calculates the offset increment value $\Delta y$ based on the energy change value $\{\Delta E_i\}_{min}$ acquired from the controller 140, the identification information k, and the coefficient information $\alpha$ and supplies the offset increment value $\Delta y$ to the controller 140. Specifically, the $\Delta y$ calculation unit 71 sorts the energy change value $\{\Delta E_i\}_{min}$ in ascending order and acquires the k-th (k-th counted from the smallest) $\Delta E_k$ from the top. The $\Delta y$ calculation unit 71 obtains $\Delta y = \max(0, \alpha \times \Delta E_k)$.

In the process of the stochastic searching unit 100, the temperature value T decreases slowly. As the temperature value T decreases, the determination threshold $Tf^{-1}(u)$ also changes. Thus, the $\Delta y$ calculation unit 71 changes the offset increment value $\Delta y$ as the temperature value T decreases. For example, it is considered that the $\Delta y$ calculation unit 71 updates the offset increment value $\Delta y$ for each of a predetermined number of iterations by the stochastic searching unit 100. The predetermined number of iterations is set to a time required for $\Delta y$ calculation processing (processing time of $\Delta y$ calculation by the CPU 51) has a value (value for reducing overhead) which is sufficiently shorter than an operation time by the stochastic searching unit 100. In an example, the number of iterations is set in advance such that the operation time by the stochastic searching unit 100 is equal to or greater than 10 times (equal to or smaller than 10% of overhead) the processing time of $\Delta y$ calculation by the CPU 51.

A circuit example of the transition control unit 130 will be described.

Figure 9:
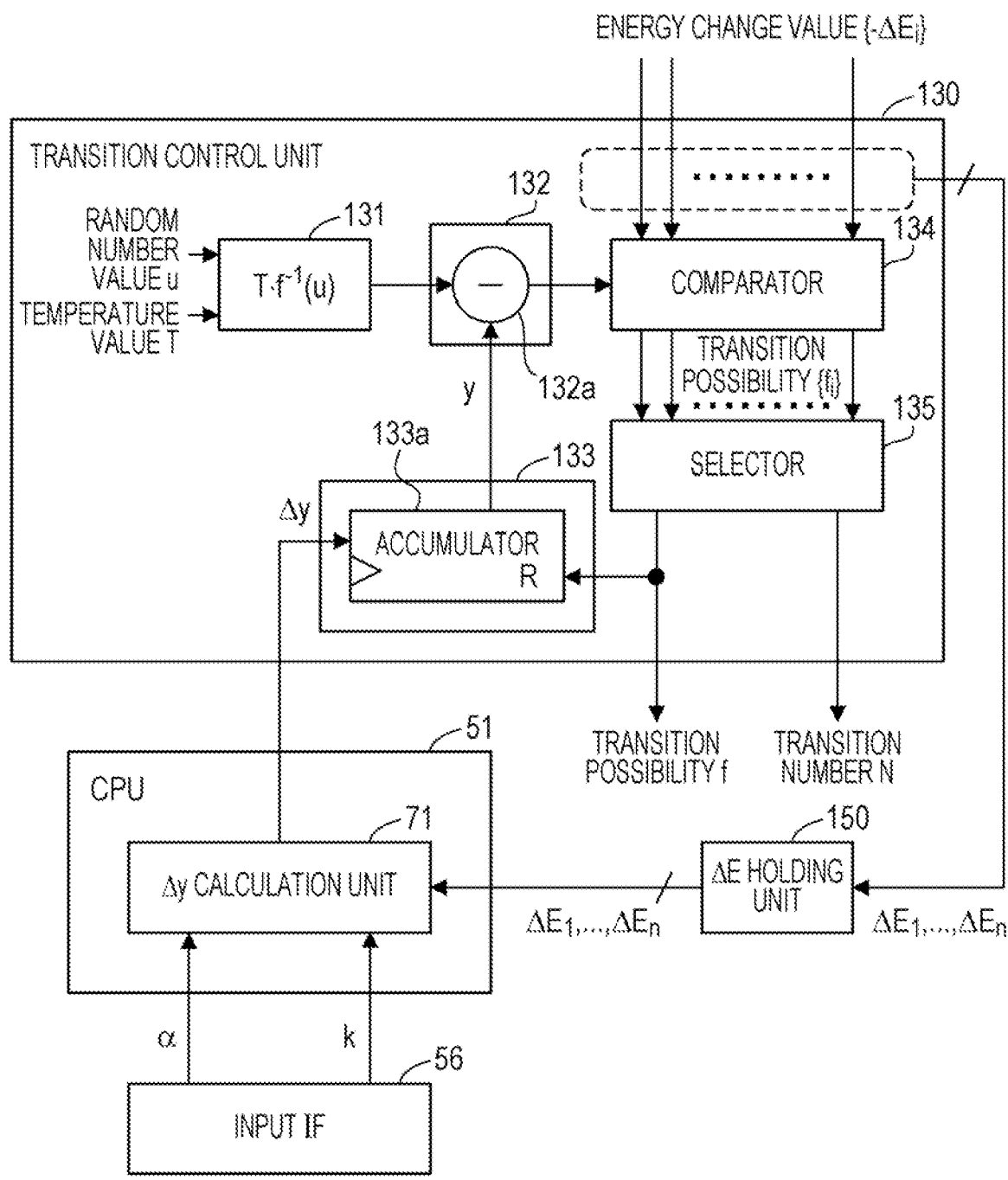
FIG. 9 is a diagram illustrating a circuit example of a transition control unit.

FIG. 9 is a diagram illustrating a circuit example of the transition control unit. The transition control unit 130 includes a thermal excitation energy generation unit 131, an offset adder circuit 132, an offset control circuit 133, a comparator 134, and a selector 135. A state machine that generates a latch configured to hold a determination result and the like and a timing is also provided in the transition control unit 130. However, FIG. 9 does not illustrate the state machine for simple illustration.

Since the thermal excitation energy generation unit 131, the offset adder circuit 132, the offset control circuit 133, the comparator 134, and the selector 135 correspond to constituent components which have the same names and are described with reference to FIG. 1, descriptions will be omitted. A subtractor 132a of the offset adder circuit 132 in FIG. 9 corresponds to the subtractor 22a in FIG. 1. An accumulator 133a of the offset control circuit 133 in FIG. 9 corresponds to the accumulator 23a in FIG. 1. The energy change value $\{\Delta E_I\}_{min}$ is held by the $\Delta E$ holding unit 150.

The offset increment value $\Delta y$ calculated by the $\Delta y$ calculation unit 71 realized by the CPU 51 is supplied to the offset control circuit 133. The identification information k and the coefficient information $\alpha$ are supplied to the $\Delta y$ calculation unit 71 by the input IF 56. The $\Delta y$ calculation unit 71 is realized by software in which the CPU 51 executes the functions of the selection unit 31 and the multiplier 32 described with reference to FIG. 1. In this case, the CPU 51 is an example of the calculation unit 17 in the first embodiment. The input IF 56 is an example of the input unit 11 in the first embodiment.

FIG. 10 is a diagram illustrating an example of the held energy change value. A table T1 represents an example of $\{\Delta E_i\}_{min}$ which is held by the $\Delta E$ holding unit 150 and is supplied to the CPU 51. In the table T1 in FIG. 10, a state after the $\{\Delta E_i\}$ is sorted in ascending order of $\{\Delta E_i\}_{min}$ by the CPU 51.

In the table T1, k indicates identification information. $\Delta E_i$ indicates the energy change value held by the $\Delta E$ holding unit 150. For example, the $\Delta y$ calculation unit 71 selects the k-th value $\Delta E_k$ from the top among the sorted energy change values, based on the table T1. As an example, at time of k=10, according to the table T1, $\Delta E_k$=7795.

Next, an example of an operation schedule of the optimization device 50, which includes the operation by the stochastic searching unit 100 and calculation of $\Delta y$ by the $\Delta y$ calculation unit 71 will be described.

Figure 11:
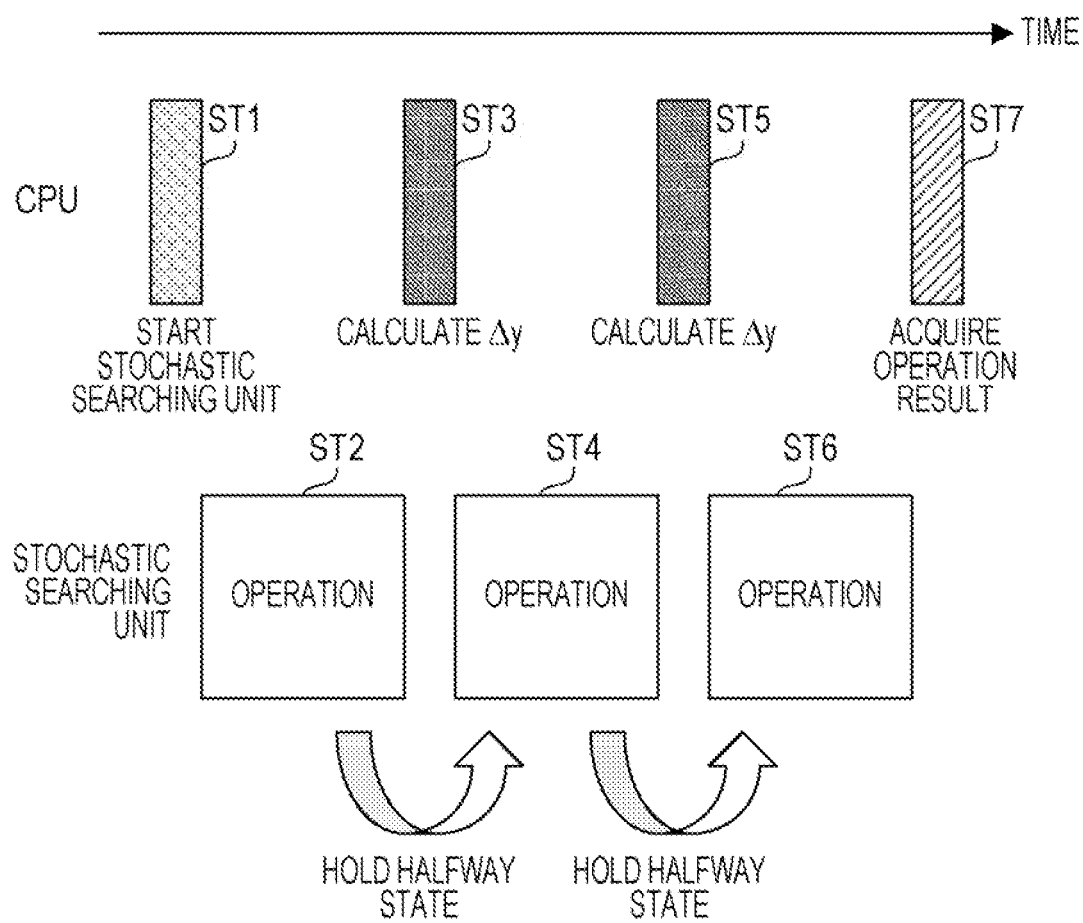
FIG. 11 is a diagram illustrating an example of an operation schedule.

FIG. 11 is a diagram illustrating an example of the operation schedule.

In the optimization device 50, the stochastic searching unit 100 and the $\Delta y$ calculation unit 71 cooperate to calculate an optimization problem. As described above, the $\Delta y$ calculation unit 71 is realized by the CPU 51. For example, the operation schedule as follows is considered.

Firstly, the CPU 51 starts the stochastic searching unit 100 (Step ST1). The CPU 51 performs initial setting (spin bit string, interaction coefficient $W_{ij}$, bias value $b_i$, and the like) or setting (temperature change schedule and the like) of an operation condition for the stochastic searching unit 100 and starts performing of the operation. The initial value of the offset increment value $\Delta y$ is 0. The initial value of the offset value y is 0.

The stochastic searching unit 100 searches the ground state in the Ising model (Step ST2). If the CPU 51 detects that the stochastic searching unit 100 performs searching corresponding to a predetermined number of iterations in Step ST2, the CPU 51 acquires the energy change value $\{\Delta E_i\}_{min}$ from the $\Delta E$ holding unit 150. The CPU 51 calculates the offset increment value $\Delta y$ based on the energy change value $\{\Delta E_i\}_{min}$, the identification information k, and the coefficient information $\alpha$ (Step ST3). The identification information k and the coefficient information $\alpha$ are input in advance by the input IF 56. The CPU 51 supplies the calculated offset increment value $\Delta y$ to the stochastic searching unit 100.

The stochastic searching unit 100 searches for the ground state in the Ising model by using the offset increment value $\Delta y$ supplied in Step ST3 (Step ST4). If the CPU 51 detects that the stochastic searching unit 100 performs searching corresponding to a predetermined number of iterations in Step ST4, the CPU 51 acquires the energy change value $\{\Delta E_i\}_{min}$ from the $\Delta E$ holding unit 150. Similar to Step ST3, the CPU 51 calculates the offset increment value $\Delta y$ (Step ST5). The CPU 51 supplies the calculated offset increment value $\Delta y$ to the stochastic searching unit 100. Thus, the offset increment value $\Delta y$ supplied to the stochastic searching unit 100 is updated.

The stochastic searching unit 100 searches for the ground state in the Ising model by using the offset increment value $\Delta y$ supplied in Step ST5 (Step ST6). When the target number of iterations is performed by the stochastic searching unit 100, the CPU 51 acquires a spin bit string corresponding to the final state, from the stochastic searching unit 100. For example, the CPU 51 causes the solution of the optimization problem corresponding to the acquired spin bit string to be displayed in the display 61 through the output IF 55.

In the example in FIG. 11, an example in which $\Delta y$ calculation steps (ST3 and ST5) are performed two times by the CPU 51 is described. However, the steps may be performed three times or more. As described above, the number of times of performing the $\Delta y$ calculation step is determined in accordance with overhead permitted for the operation time of the stochastic searching unit 100.

Next, the process procedure by the CPU 51 will be described.

Figure 12:
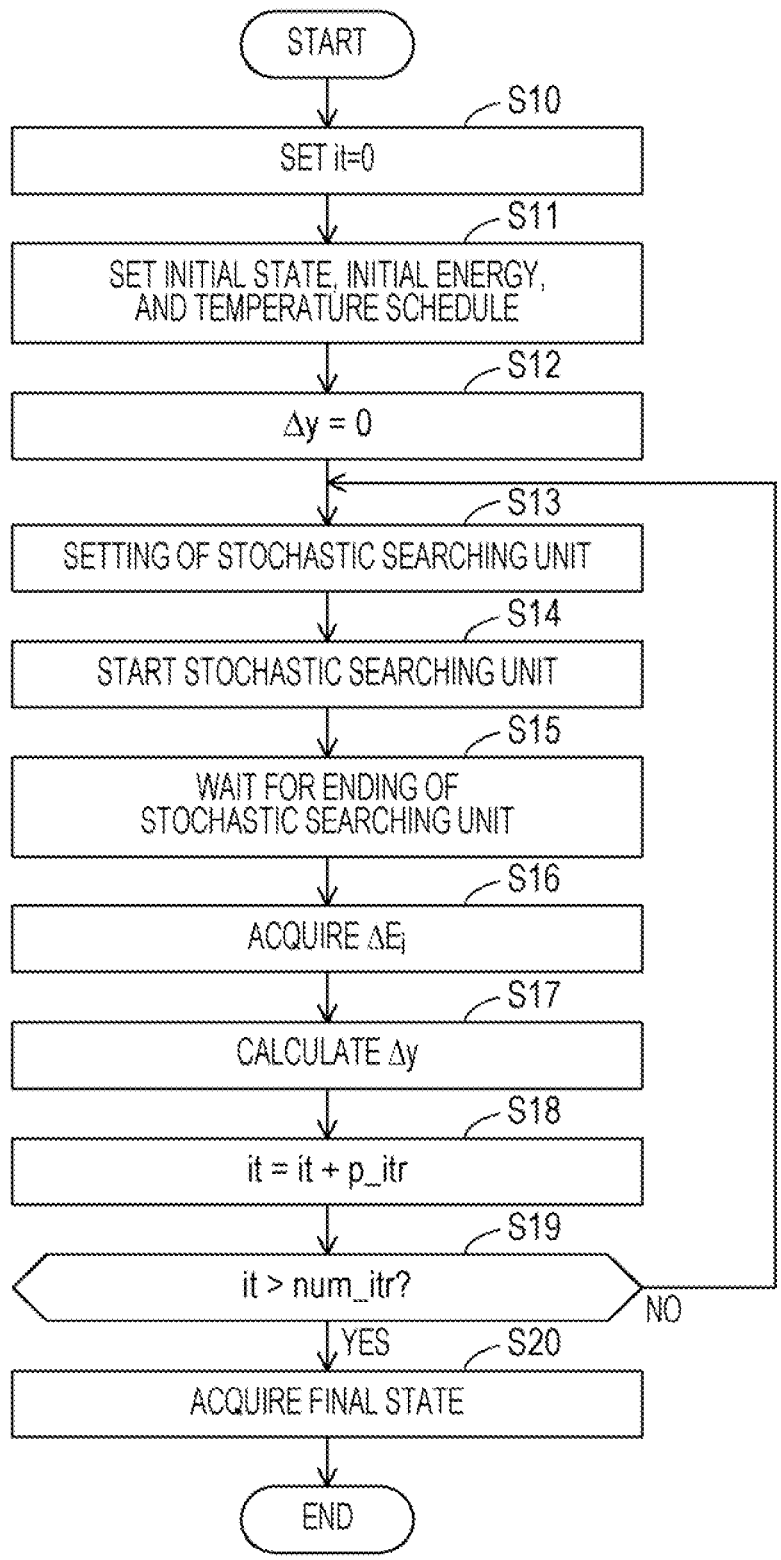
FIG. 12 is a flowchart illustrating a process example of the optimization device.

FIG. 12 is a flowchart illustrating a process example of the optimization device. (S10) The CPU 51 sets a counter it configured to count the number of iterations to 0.

(S11) The CPU 51 sets the initial state (initial value of the spin bit string or initial value of the temperature value T, for example), initial energy, and a temperature schedule in the stochastic searching unit 100. At this time, the CPU 51 sets the interaction coefficient $W_{ij}$ between spin bits and the bias value $b_i$ in the stochastic searching unit 100.

(S12) The CPU 51 sets the offset increment value $\Delta y$ to 0. (S13) The CPU 51 supplies the offset increment value $\Delta y$=0 to the stochastic searching unit 100.

(S14) The CPU 51 starts stochastic searching unit 100 by the number p_itr of iterations to $\Delta y$ calculation. (S15) The CPU 51 waits for ending an operation up to the number p_itr of iterations by the stochastic searching unit 100. A state after the iterations of which the number is p_itr by the stochastic searching unit 100 or a state at the minimum energy is held in the stochastic searching unit 100.

(S16) If the operation up to the number p_itr of iterations by the stochastic searching unit 100 ends, the CPU 51 acquires $\{\Delta E_i\}$ (=$\{\Delta E_i\}_{min}$) held by the $\Delta E$ holding unit 150 of the stochastic searching unit 100.

(S17) The CPU 51 calculates the offset increment value $\Delta y$ based on the identification information k and the coefficient information $\alpha$ input by the input IF 56, and $\{\Delta E_i\}$ (=$\{\Delta E_i\}_{min}$). (S18) The CPU 51 adds p_itr to the counter it (it=it+p_itr).

(S19) The CPU 51 determines whether or not to satisfy it>num_itr. In a case of it>num_itr, the process proceeds to Step S20. In a case of it ≤num_itr, the process proceeds to Step S13. num_itr indicates the number of iterations performed until the final state is obtained, by the stochastic searching unit 100.

Figure 13:
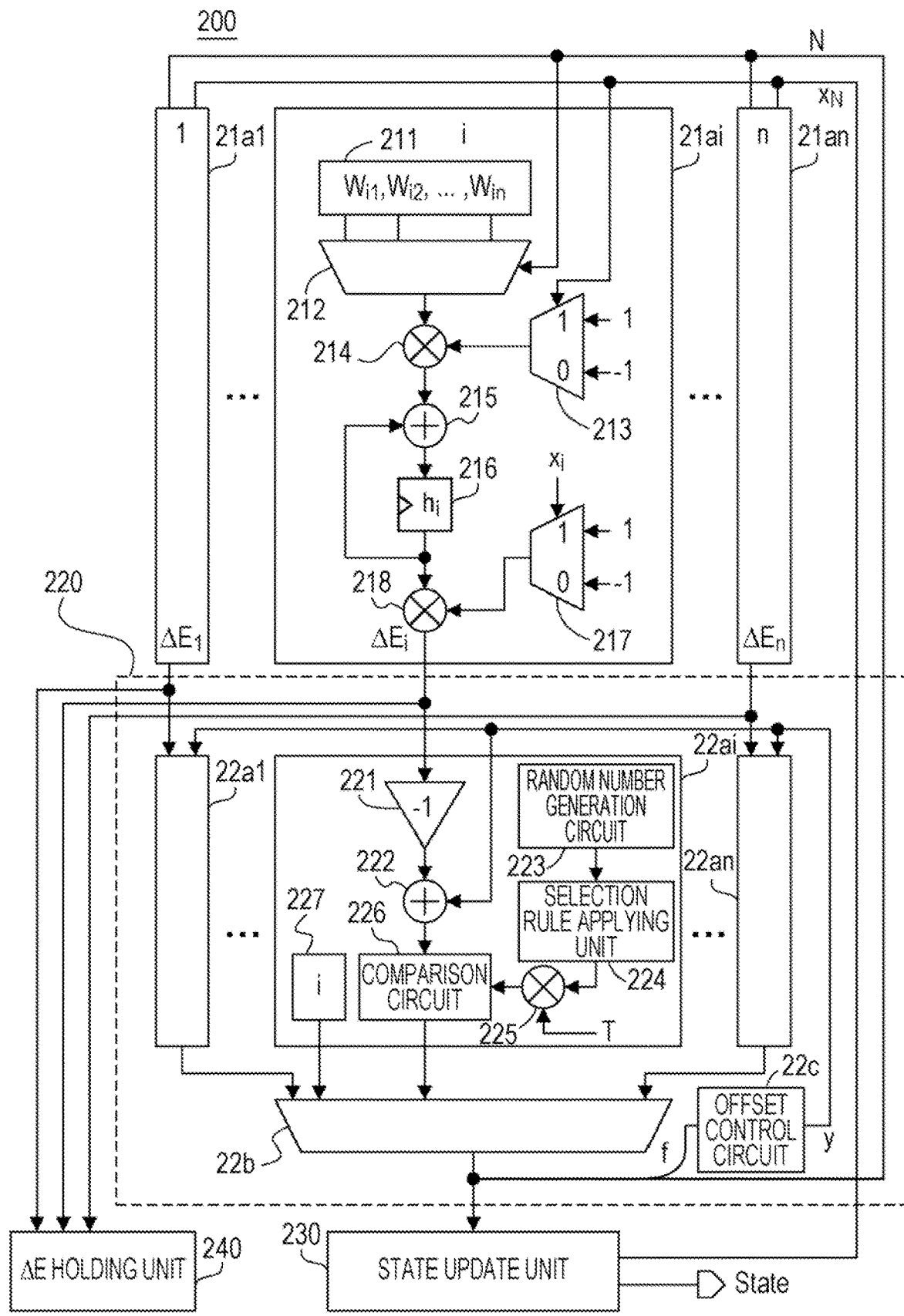
FIG. 13 is a diagram illustrating a circuit example of a stochastic searching unit.

(S20) The CPU 51 acquires the final state (spin bit string indicating the final state) from the stochastic searching unit 100. The process ends. FIG. 13 is a diagram illustrating a circuit example of the stochastic searching unit.

For example, with a circuit configuration of a stochastic searching unit 200, it is possible to realize the function equivalent to the function of the stochastic searching unit 100. The stochastic searching unit 200 includes energy calculation units 21a1, 21ai, . . . , and 21an, a transition control unit 220, a state update unit 230, and a DE holding unit 240.

The energy calculation units 21a1 to 21an are examples of the energy calculation unit 120 illustrated in FIG. 8, and calculate and output energy change values (corresponding to $\Delta E_1$, . . . , $\Delta E_i$, . . . , and $\Delta E_n(\{\Delta E_i\})$).

For example, the energy calculation unit 21ai includes a register 211, selectors 212 and 213, a multiplier 214, an adder 215, a register 216, a selector 217, and a multiplier 218.

The register 211 stores interaction coefficients $W_{i1}$, $W_{i2}$, . . . , and $W_{in}$ between spin bits in Expression (9) and the like described above. The interaction coefficients $W_{i1}$ to $W_{in}$ are calculated in advance, in accordance with a problem to be calculated, by the controller 140 (not illustrated in FIG. 13) in the stochastic searching unit 100 or the CPU 51 and are stored in the register 211. The interaction coefficients $W_{i1}$ to $W_{in}$ described above may be stored in the memory such as the RAM.

The selector 212 selects and output one of the interaction coefficients $W_{i1}$ to $W_{in}$ stored in the register 211 based on the transition number N output by the transition control unit 220. For example, when N=n is selected to the selector 212, the selector 212 selects the interaction coefficient $W_{in}$.

The selector 213 selects and outputs 1 or -1 based on the updated spin bit $x_N$ output by the state update unit 83. The selector 213 selects and outputs -1 when the updated $x_N$ is 0, and selects and outputs 1 when the updated $x_N$ is 1.

The multiplier 214 outputs a product obtained by multiplying the interaction coefficient output by the selector 212 and a value output by the selector 213. The adder 215 outputs a sum obtained by adding a multiplication result output by the multiplier 214 and a value stored in the register 216.

The register 216 takes in a value output by the adder 215 in synchronization with a clock signal (not illustrated). The register 216 is, for example, a flip flop. The value stored in the register 216 is a local field value $h_i$ in Expression (11).

The selector 217 outputs 1 when the changed spin bit $x_i$ is 0, and outputs -1 when the changed spin bit $x_i$ is 1. The output of the selector 217 corresponds to $-\Delta x_i$ in Expression (10). FIG. 13 illustrates an example in which the spin bit $x_i$ before change is supplied to the selector 217.

The multiplier 218 outputs a product obtained by multiplying the local field value $h_i$ output by the register 216 and the value output by the selector 217, as the energy change value ($\Delta E_i$). The transition control unit 220 includes circuit units 22a1, 22ai, ..., and 22an, a selector 22b, and an offset control circuit 22c.

The circuit units 22a1 to 22an perform the functions of the thermal excitation energy generation unit 131, the offset adder circuit 132, and the comparator 134 in the transition control unit 130 illustrated in FIG. 9 by dividing the functions for each candidate for the state transition. The selector 22b corresponds to the selector 135 illustrated in FIG. 9. The offset control circuit 22c corresponds to the offset control circuit 133 illustrated in FIG. 9.

For example, the circuit unit 22ai includes a sign inversion circuit 221, an adder 222, a random number generation circuit 223, a selection rule applying unit 224, a multiplier 225, a comparison circuit 226, and an index holding unit 227.

The sign inversion circuit 221 inverts the sign of the energy change value $\Delta E_I$ output by energy calculation unit 21ai, and thus outputs $-\Delta E_i$. In the example in FIG. 13, the transition control unit 220 is different from the transition control unit 130 in that $\Delta E_i$ is changed to $-\Delta E_i$.

The adder 222 adds the offset value y supplied by the offset control circuit 22c to $-\Delta E_i$ output by the sign inversion circuit 221. In the example in FIG. 13, the adder 222 is different from the transition control unit 130 in that the offset value y is not subtracted from the thermal excitation energy, but the offset value y is added to the energy change value ($-\Delta E$).

The random number generation circuit 223 generates the uniform random number u and supplies the uniform random number u to the selection rule applying unit 224. The selection rule applying unit 224 outputs the value of the function $f^{-1}(u)$ depending on the uniform random number u, based on a conversion table corresponding to a rule to be used among a Metropolis and a Gibbs method.

The multiplier 225 outputs a product $Tf^{-1}(u)$ (corresponding to the thermal excitation energy) obtained by multiplying the temperature value T supplied from the temperature control unit (not illustrated) and the function $f^{-1}(u)$, to the comparison circuit 226.

The comparison circuit 226 performs determination of $-\Delta E_i$ and $Tf^{-1}(u)$ based on Expression (8). In a case where Expression (8) is satisfied, the comparison circuit 226 outputs $f_i$ indicating that a transition is possible, to the selector 22b. In a case where Expression (8) is not satisfied, the comparison circuit 226 outputs $f_i$ indicating that a transition is not possible, to the selector 22b.

The index holding unit 227 outputs an index i of a spin bit corresponding to the energy calculation unit 21ai and the circuit unit 22ai to the selector 22b. The transition control unit 220 performs an operation similar to that of the transition control unit 130 illustrated in FIG. 9, with the above configuration.

The state update unit 230 has the function of the state holding unit 110 illustrated in FIG. 8, and updates values of the held spin bit $x_1$ to $x_n$ based on the transition possibility f and the transition number N output by the transition control unit 220 and outputs a combination (State) of the values. The state update unit 230 outputs the updated value (described as $x_N$ in the example in FIG. 13) of the spin bit.

The $\Delta E$ holding unit 240 holds the energy change value $\{\Delta E_i\}=\{\Delta E_i\}_{min}$ at time of the lowest energy state. The $\Delta E$ holding unit 240 corresponds to the $\Delta E$ holding unit 150 illustrated in FIG. 8.

The optimization device 50 may realize the function similar to that of the stochastic searching unit 100 with the stochastic searching unit 200.

Third Embodiment

Next, a third embodiment will be described. Items different from the above-described second embodiment will be mainly described, and descriptions of the common items will be omitted.

In the second embodiment, the energy change value $\{\Delta E_i\}_{min}$ at time of the minimum energy state is held by the $\Delta E$ holding unit 150 or the $\Delta E$ holding unit 240. The third embodiment is different in that a minimum energy state holding unit that holds a spin bit string representing the minimum energy state in addition to energy change value $\{\Delta E_i\}_{min}$ at time of the minimum energy state is provided in the stochastic searching unit. In the third embodiment, the energy change value $\{\Delta E_i\}_{min}$ is calculated by the CPU 51 based on the spin bit string representing the minimum energy state.

Figure 14:
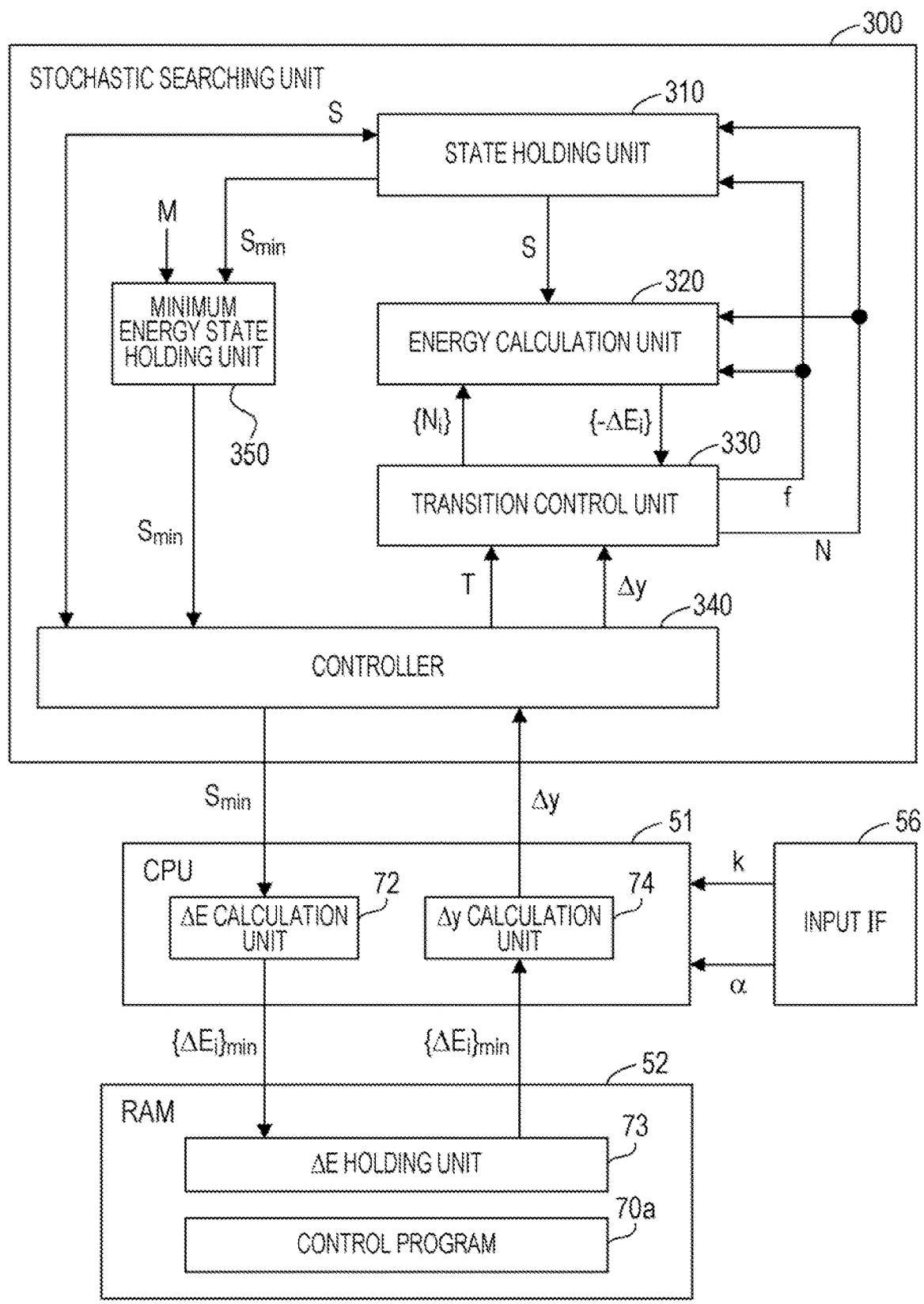
FIG. 14 is a diagram illustrating a function example of an optimization device according to a third embodiment.

FIG. 14 is a diagram illustrating a function example of an optimization device according to the third embodiment. Hardware of an optimization device 50a in the third embodiment is similar to the hardware of the optimization device 50 in the second embodiment illustrated in FIG. 7. The optimization device 50a includes a stochastic searching unit 300 instead of the stochastic searching unit 100.

The stochastic searching unit 300 includes a state holding unit 310, an energy calculation unit 320, a transition control unit 330, a controller 340, and a minimum energy state holding unit 350. The state holding unit 310, the energy calculation unit 320, and the transition control unit 330 correspond to the circuits which have the same names and are illustrated in FIG. 8.

The controller 340 controls an operation by the stochastic searching unit 300. Specifically, the controller 340 sets an initial value of a spin bit string in the state holding unit 310. The controller 340 sets the interaction coefficient $W_{ij}$ between spin bits and the bias value $b_i$ in the energy calculation unit 320. The controller 340 controls the temperature value T indicating a temperature to the transition control unit 330. Further, the controller 340 supplies the offset increment value $\Delta y$ to the transition control unit 330.

The controller 340 acquires a spin bit string (represented by $S_{min}$) of the minimum energy state held by the minimum energy state holding unit 350 and supplies the acquired spin bit string to the CPU 51. If the operation by the stochastic searching unit 300 ends, the controller 340 acquires the spin bit string in the final state from the state holding unit 310 and supplies the spin bit string in the final state, as a solution of the optimization problem, to the CPU 51.

If the minimum value of the energy value is updated, the minimum energy state holding unit 350 holds spin bit string (values of the plurality of state variables) at the minimum value. More specifically, if the minimum energy update signal M is supplied, the minimum energy state holding unit 350 holds a spin bit string supplied by the state holding unit 310 at a supply timing of M, as the spin bit string $S_{min}$ of the minimum energy state. The minimum energy state holding unit 350 supplies the spin bit string $S_{min}$ to the controller 340.

For example, the minimum energy obtained for the state in the Ising model may be held by the controller 340. The energy obtained for the state in the Ising model may be calculated by Expression (9). If the minimum energy calculated by Expression (9) is updated, the controller 340 may supply the minimum energy update signal M to the minimum energy state holding unit 350. Alternatively, the stochastic searching unit 300 may further include a minimum energy holding unit (not illustrated in FIG. 8) that holds the minimum energy calculated by Expression (9). The minimum energy holding unit may supply the minimum energy update signal M to the minimum energy state holding unit 350 in accordance with the update of the minimum energy.

The CPU 51 execute a control program 70a of the optimization device 50a, which has been stored in the RAM 52 so as to exhibit functions of a $\Delta E$ calculation unit 72 and a $\Delta y$ calculation unit 74. The $\Delta E$ calculation unit 72 calculates the energy change value $\{\Delta E_i\}_{min}$ corresponding to each state transition in which the spin bit string $S_{min}$ (minimum energy state) is set as a transition source, based on the spin bit string $S_{min}$ held by the minimum energy state holding unit 350 every time determination of whether or not the state transition for the spin bit string S (plurality of state variables) is performed a predetermined number of times. Then, the $\Delta E$ calculation unit 72 stores the calculated energy change value $\{\Delta E_i\}_{min}$ in the $\Delta E$ holding unit 73 in the RAM 52.

That is, the $\Delta E$ calculation unit 72 acquires the spin bit string $S_{min}$ from the controller 340 and calculates the energy change value $\{\Delta E_i\}_{min}$ with Expressions (10) and (11). The $\Delta E$ calculation unit 72 stores the calculated energy change value $\{\Delta E_i\}_{min}$ in the $\Delta E$ holding unit 73. The $\Delta E$ holding unit 73 is an example of the holding unit 15 in the first embodiment illustrated in FIG. 1.

The $\Delta y$ calculation unit 74 calculates the offset increment value $\Delta y$ based on the energy change value $\{\Delta E_i\}_{min}$ stored in the $\Delta E$ holding unit 73. Specifically, the $\Delta y$ calculation unit 74 acquires $\Delta E_k$ from the energy change value $\{\Delta E_i\}_{min}$ based on identification information k input by the input IF 56. An acquisition method of $\Delta E_k$ is similar to an acquisition method of $\Delta E_k$ by the $\Delta y$ calculation unit 71. The $\Delta y$ calculation unit 74 calculates the offset increment value $\Delta y=\max(0, \alpha \times \Delta E_k)$ with the coefficient information $\alpha$ input by the input IF 56. The $\Delta y$ calculation unit 74 outputs the calculated offset increment value $\Delta y$ to the controller 340.

Similar to the second embodiment, it is considered that the $\Delta E$ calculation unit 72 and the $\Delta y$ calculation unit 74 update the offset increment value $\Delta y$ for each of a predetermined number of iterations by the stochastic searching unit 300. The predetermined number of iterations is set such a time required for $\Delta y$ calculation processing (processing time of $\Delta y$ calculation by the CPU 51) has a value (value for reducing overhead) which is sufficiently shorter than an operation time by the stochastic searching unit 300.

Figure 15:
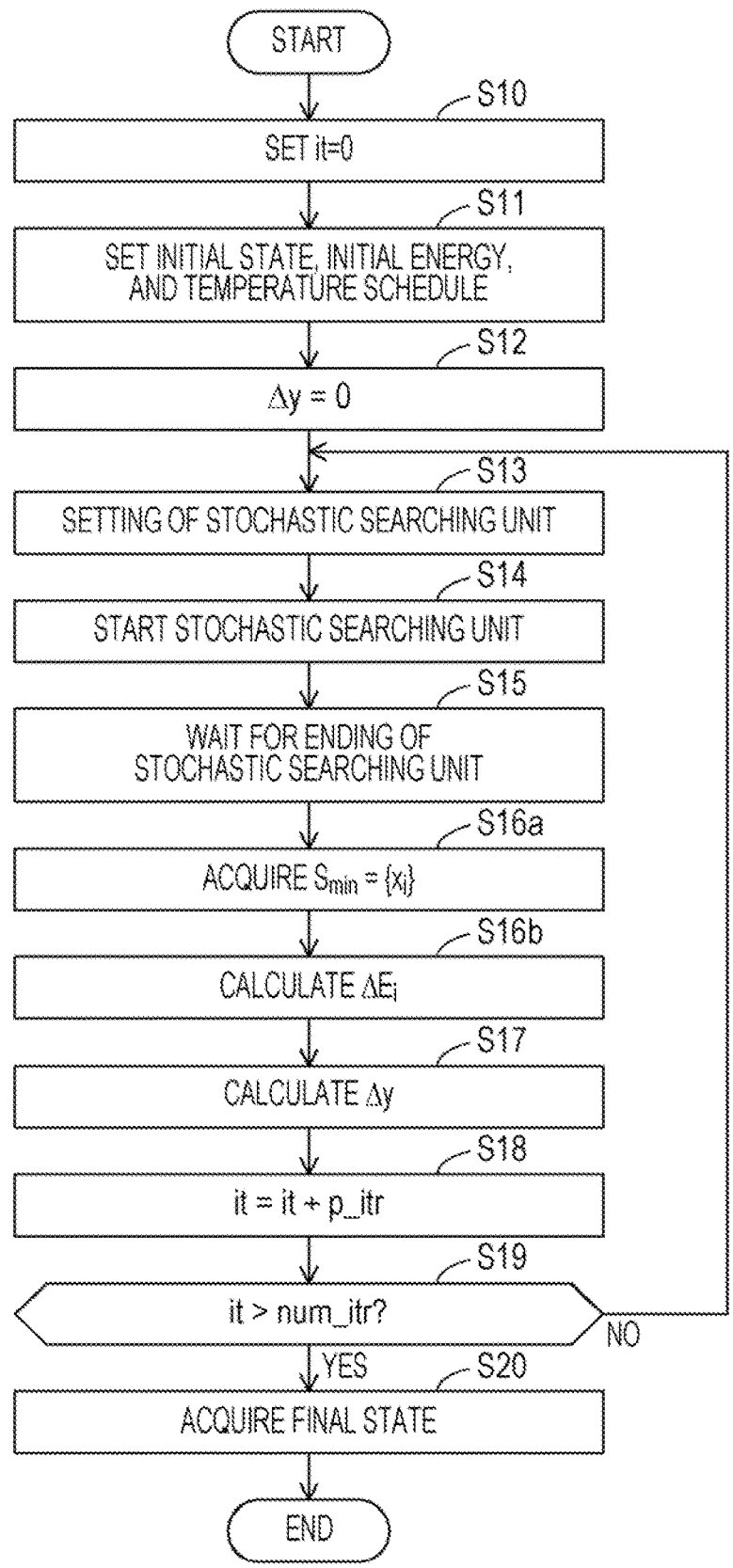
FIG. 15 is a flowchart illustrating a process example of the optimization device.

Next, a process procedure of the CPU 51 in the optimization device 50a will be described. FIG. 15 is a flowchart illustrating the process example of the optimization device. The third embodiment is different in that Steps S16a and S16b are performed instead of Step S16 in the procedure in the second embodiment illustrated in FIG. 12. Therefore, in the following descriptions, Steps S16a and S16b will be described, and descriptions of other steps will be omitted. Step S16a is performed next to Step S15.

(S16a) If the operation up to the number p_itr of iterations by the stochastic searching unit 300 ends, the CPU 51 acquires a spin bit string $S_{min}(=\{x_i\})$ held by the minimum energy state holding unit 350 of the stochastic searching unit 300.

(S16b) The CPU 51 calculates the energy change value $\{\Delta E_i\}=\{\Delta E_i\}_{min}$ based on Expressions (10) and (11). The process proceeds to step S17.

As described above, the energy change value $\{\Delta E_i\}_{min}$ may be calculated by the CPU 51. In this case, the stochastic searching unit 300 may supply the spin bit string $S_{min}$ to the CPU 51. Thus, even though the stochastic searching unit 300 does not have a function to supply the energy change value to the CPU 51, it is possible to appropriately change the offset increment value $\Delta y$.

Figure 16:
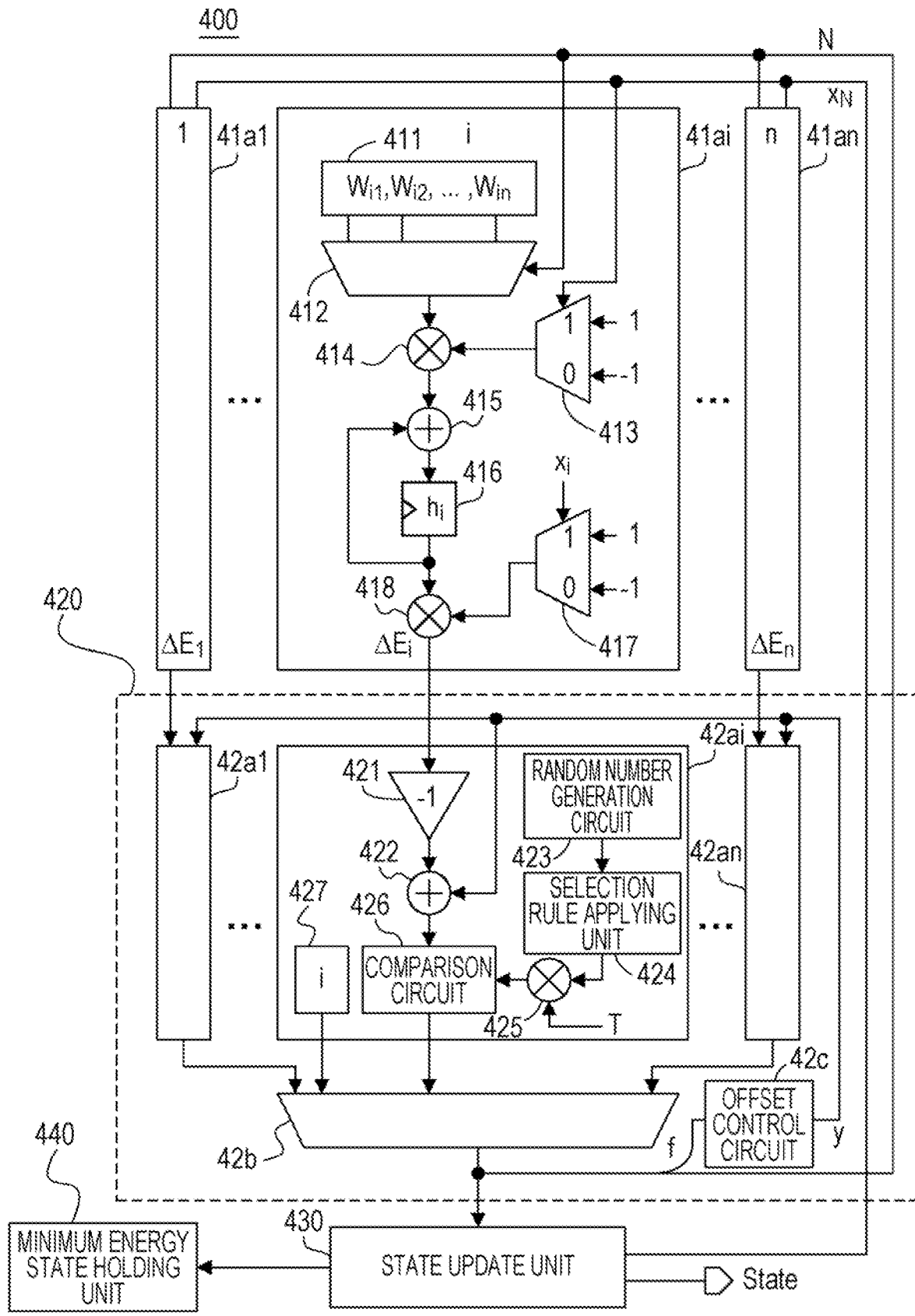
FIG. 16 is a diagram illustrating a circuit example of a stochastic searching unit.

FIG. 16 is a diagram illustrating a circuit example of the stochastic searching unit. For example, with a circuit configuration of a stochastic searching unit 400, it is possible to realize the function equivalent to the function of the stochastic searching unit 300. The stochastic searching unit 400 includes energy calculation units 41a1, 41ai, . . . , and 41an, a transition control unit 420, a state update unit 430, and a minimum energy state holding unit 440.

The energy calculation units 41a1 to 41an are examples of the energy calculation unit 320 illustrated in FIG. 14, and calculate and output energy change values (corresponding to $\Delta E_1, \ldots, \Delta E_i, \ldots,$ and $\Delta E_n(\{\Delta E_i\})$).

For example, the energy calculation unit 41ai includes a register 411, selectors 412 and 413, a multiplier 414, an adder 415, a register 416, a selector 417, and a multiplier 418.

The register 411, the selectors 412 and 413, the multiplier 414, the adder 415, the register 416, the selector 417, and the multiplier 418 are similar to the circuit components which have the same names and are illustrated in FIG. 13.

The transition control unit 420 includes circuit units 42a1, . . . , 42ai, . . . , and 42an, a selector 42b, and an offset control circuit 42c. The circuit units 42a1 to 42an correspond to the circuit units 22a1 to 22an illustrated in FIG. 13. For example, the circuit unit 42ai includes a sign inversion circuit 421, an adder 422, a random number generation circuit 423, a selection rule applying unit 424, a multiplier 425, a comparison circuit 426, and an index holding unit 427. The sign inversion circuit 421, the adder 422, the random number generation circuit 423, the selection rule applying unit 424, the multiplier 425, the comparison circuit 426, and the index holding unit 427 are similar to the circuit components which have the same names and are illustrated in FIG. 13. The selector 42b corresponds to the selector 22b illustrated in FIG. 13. The offset control circuit 42c corresponds to the offset control circuit 22c illustrated in FIG. 13.

The offset increment value Δy is supplied to the offset control circuit 42c by the controller (not illustrated). The offset control circuit 42c supplies the offset value y calculated based on the offset increment value by to the circuit units 42a1 to 42an.

The transition control unit 420 performs an operation similar to that of the transition control unit 330 illustrated in FIG. 14, with the above configuration. The state update unit 430 has the function of the state holding unit 310 illustrated in FIG. 14, and updates values of the held spin bit $x_1$ to $x_n$ based on the transition possibility f and the transition number N output by the transition control unit 330 and outputs a combination (State) of the values. The state update unit 430 outputs the updated value (described as $x_N$ in the example in FIG. 16) of the spin bit.

The minimum energy state holding unit 440 acquires and holds the spin bit string at time of the lowest energy state from the state update unit 430. The optimization device 50a may realize the function similar to that of the stochastic searching unit 300 with the stochastic searching unit 400.

Fourth Embodiment

Next, a fourth embodiment will be described. Items different from those in the second and third embodiments described above will be mainly described, and descriptions of the common items will be omitted.

In the second and third embodiments, an example in which the function of calculating the offset increment value Δy is realized by software executed by the CPU 51 is described. In the fourth embodiment, an example in which the function of calculating the offset increment value Δy is realized by dedicated hardware will be described. In this case, "the optimization device" may not include the CPU 51 as follows ("the optimization device" may include the CPU 51).

Figure 17:
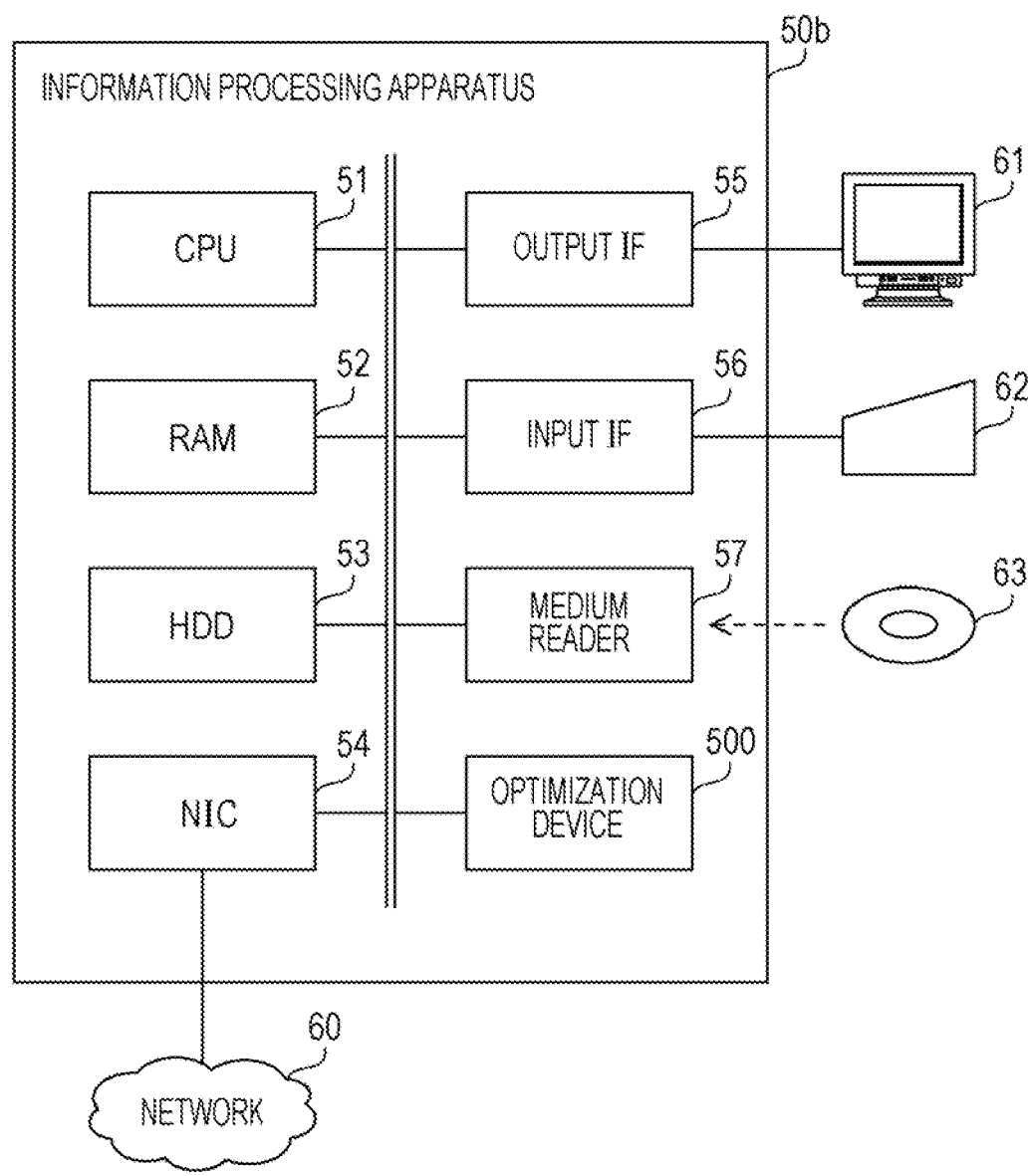
FIG. 17 is a diagram illustrating a hardware example of an information processing apparatus according to a fourth embodiment.

FIG. 17 is a diagram illustrating a hardware example of an information processing apparatus according to the fourth embodiment. An information processing apparatus 50b includes a CPU 51, a RAM 52, an HDD 53, a NIC 54, an output IF 55, an input IF 56, a medium reader 57, and an optimization device 500. Each piece of hardware is coupled to a bus of the information processing apparatus 50b. The bus is, for example, a PCIe bus.

The CPU 51, the RAM 52, the HDD 53, the NIC 54, the output IF 55, the input IF 56, and the medium reader 57 are similar to the hardware which has the same name and is illustrated in FIG. 7. The optimization device 500 performs an operation on an optimization problem in accordance with an instruction of the CPU 51, similar to the stochastic searching unit 100. The optimization device 500 is, for example, a one-chip semiconductor integrated circuit and is realized using a FPGA or the like. The optimization device 500 includes hardware dedicated for calculating the offset increment value Δy.

Figure 18:
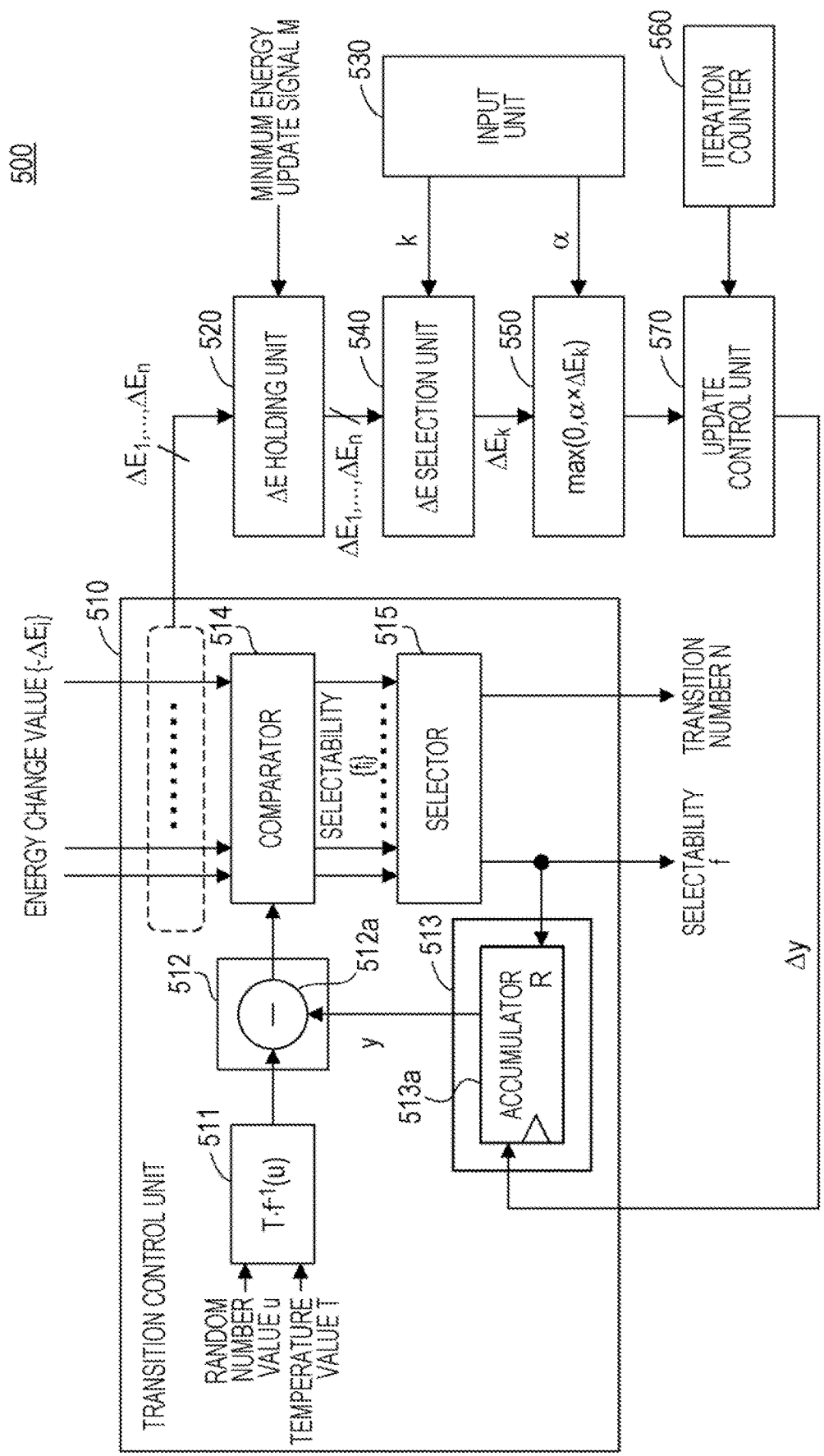
FIG. 18 is a diagram illustrating a circuit example of an optimization device.

FIG. 18 is a diagram illustrating a circuit example of the optimization device. The optimization device 500 includes a transition control unit 510, a ΔE holding unit 520, an input unit 530, a ΔE selection unit 540, a Δy calculation unit 550, an update control unit 570, and an iteration counter 560. The optimization device 500 also include circuits corresponding to the state holding unit 110, the energy calculation unit 120, and the controller 140 illustrated in FIG. 8. However, in FIG. 18, illustrations thereof are omitted for simple illustration.

The transition control unit 510 realizes the function similar to that of the transition control unit 16 illustrated in FIG. 1. The transition control unit 510 includes a thermal excitation energy generation unit 511, an offset adder circuit 512, an offset control circuit 513, a comparator 514, and a selector 515. The thermal excitation energy generation unit 511, the offset adder circuit 512, the offset control circuit 513, the comparator 514, and the selector 515 are similar to the circuit components which have the same names and are illustrated in FIG. 1. A state machine that generates a latch configured to hold a determination result and the like and a timing is also provided in the transition control unit 510. However, FIG. 18 does not illustrate the state machine for simple illustration.

If the minimum energy update signal M is supplied, the ΔE holding unit 520 holds $\{\Delta E_I\}=\{\Delta E_i\}_{min}$ at this time. The ΔE holding unit 520 corresponds to the holding unit 15 illustrated in FIG. 1.

The input unit 530 receives an input of identification information k by the CPU 51 and supplies the identification information k to the ΔE selection unit 540. The input unit 530 receives an input of coefficient information α by the CPU 51 and supplies the coefficient information α to the Δy calculation unit 550.

The ΔE selection unit 540 selects the k-th (k-th counted from the smallest) $\Delta E_k$ from the top among the energy change value $\{\Delta E_i\}_{min}$ held by the ΔE holding unit 520. The ΔE selection unit 540 supplies $\Delta E_k$ to the Δy calculation unit 550. A circuit example of the ΔE selection unit 540 will be described later.

The Δy calculation unit 550 calculates the offset increment value $\Delta y = \max(0, \alpha \times \Delta E_k)$ and supplies the offset increment value Δy to the update control unit 570. The iteration counter 560 is a counter that counts the number of iterations of the state transition.

The update control unit 570 updates the offset increment value Δy to an accumulator 513a every time the number of iterations counted by the iteration counter 560 reaches a predetermined value (p_itr).

Figure 19:
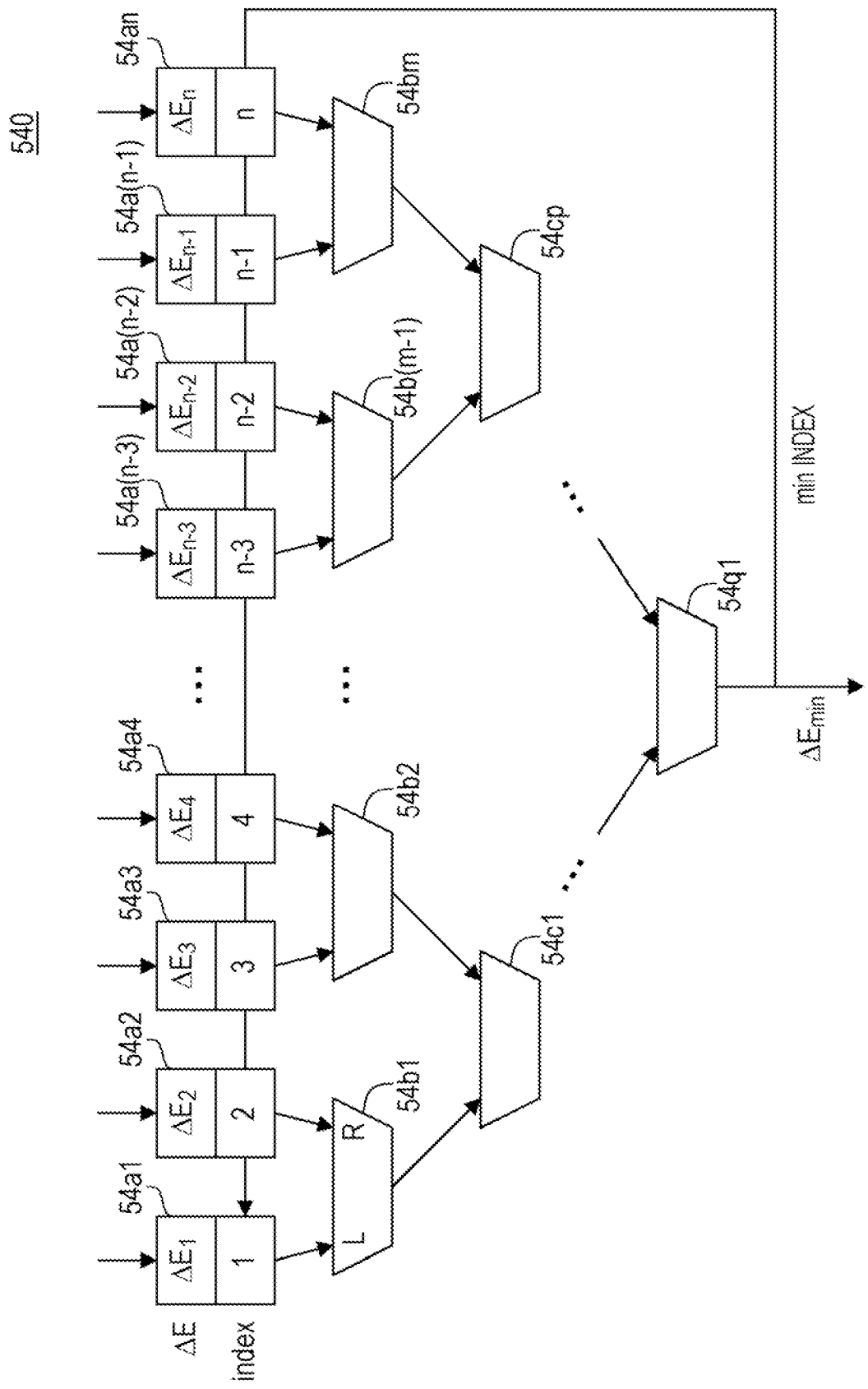
FIG. 19 is a diagram illustrating a circuit example of a ΔE selection unit.

Next, the circuit example of the ΔE selection unit 540 will be described. FIG. 19 is a diagram illustrating the circuit example of the ΔE selection unit. The ΔE selection unit 540 includes registers 54a1, 54a2, 54a(n-1), and 54an. The registers 54a1 to 54an are provided for each spin bit. $\Delta E_i$ ($=\Delta E_1, \Delta E_2, \ldots, \Delta E_{n-1}$, and $\Delta E_n$) and an index (index=1, 2, ..., n-1, and n) corresponding to each spin bit are stored in the registers 54a1 to 54an, respectively. ΔE, corresponding to each spin bit is supplied to the ΔE selection unit 540 by the ΔE holding unit 520.

The ΔE selection unit 540 includes a plurality of selectors coupled to multiple stages in a tree shape. The plurality of selectors select the k-th smallest $\Delta E_k$ among $\Delta E_i$ stored in the registers 54a1 to 54an.

Each of the selectors 54b1 to 54bm at a first stage selects and outputs a set having smaller ΔE among two sets of ΔE and indices stored in two registers adjacent to each other among the registers 54a1 to 54an at the previous stage. The number m of the selectors 54b1 to 54bm is n/2.

Each of the selectors 54c1 to 54cp at a second stage selects and outputs a set having smaller ΔE among two sets of ΔE and indices output from two selectors adjacent to each other among the selectors 54b1 to 54bm at the previous stage. The number p of the selectors 54c1 to 54cp is m/2.

Similarly, at a third stage and the subsequent stages, a set having smaller ΔE among two sets of ΔE and indices output from two selectors adjacent to each other at the previous stage is output by the selector at the third stage and the subsequent stages. Two sets of ΔE and indices are input to a selector 54q1 at the final stage from two selectors at the previous stage. The selector 54q1 selects a set having smaller ΔE among the input two sets, and thus one set of ΔE=ΔE$_{min}$ and the index (min index), which has been finally narrowed, is output by the selector 54q1.

In this manner, with the selectors 54b1 to 54q1, the minimum value ΔE$_{min}$ among ΔE$_i$ stored (effective) in the registers 54a1 to 54an is selected. The selector 54q1 sets an index corresponding to the min index among the indices stored in the registers 54a1 to 54an to an invalid value (for example, −1). In the registers 54a1 to 54an, if an invalid value is set in the index, ΔE corresponding to this index becomes invalid. If ΔE becomes invalid, the minimum ΔE=ΔE$_{min}$ is selected with excluding ΔE$_{min}$ which has been selected the previous time, in the next selection by the selectors 54b1 to 54q1.

Next, a selection logic by the ΔE selection unit 540 will be specifically described. In the following descriptions, among indices corresponding to two inputs of each of the selectors 54b1 to 54q1, the index on the left (side on which the index is smaller) in the drawings may be referred to as "an index L", and the index on the right (side on which the index is larger) may be referred to as "an index R". In FIG. 19, as an example, "L" indicating the index L and "R" indicating index the R are illustrated to the inputs of the selector 54b1.

FIG. 20 is a diagram illustrating an example of a selection logic of the ΔE selection unit. A selection logic Z1 is an example of the selection logic by each of the selectors 54b1 to 54q1. In the selection logic Z1, items of the index L, the index R, a relation between ΔE$_L$ and ΔE$_R$, and a selection result are represented.

The index L indicates the smaller index among the indices input to each of the selectors 54b1 to 54q1. The index R indicates the larger index among the indices input to each of the selectors 54b1 to 54q1. ΔE$_L$ is the energy change value corresponding to the index L. ΔE$_R$ is the energy change value corresponding to the index R. The relation between ΔE$_L$ and ΔE$_R$ indicates the magnitude relation between ΔE$_L$ and ΔE$_R$. The selection result means a selection result by each of the selectors 54b1 to 54q1 in accordance with the index L, the index R, and the relation between ΔE$_L$ and ΔE$_R$. "d/c" in FIG. 20 indicates "don't care" and indicates no influence on the selection result.

For example, in a case where the indices L and R are equal to or greater than 0, and the relation between ΔE$_L$ and ΔE$_R$ is "ΔE$_L$≤ΔE$_R$", each of the selectors 54b1 to 54q1 selects a set of the index L and ΔE$_L$.

In a case where the indices L and R are equal to or greater than 0, and the relation between ΔE$_L$ and ΔE$_R$ is "ΔE$_L$>ΔE$_R$", each of the selectors 54b1 to 54q1 selects a set of the index R and ΔE$_R$.

In a case where the index L is "−1" (invalid value), and the index R is equal to or greater than 0, each of the selectors 54b1 to 54q1 selects a set of the index R and ΔE$_R$.

In a case where the index L is equal to or greater than 0, and the index R is "−1", each of the selectors 54b1 to 54q1 selects a set of the index L and ΔE$_L$. In a case where the indices L and R are "−1" (invalid value), each of the selectors 54b1 to 54q1 selects a set of the index L and ΔE$_L$.

Figure 21:
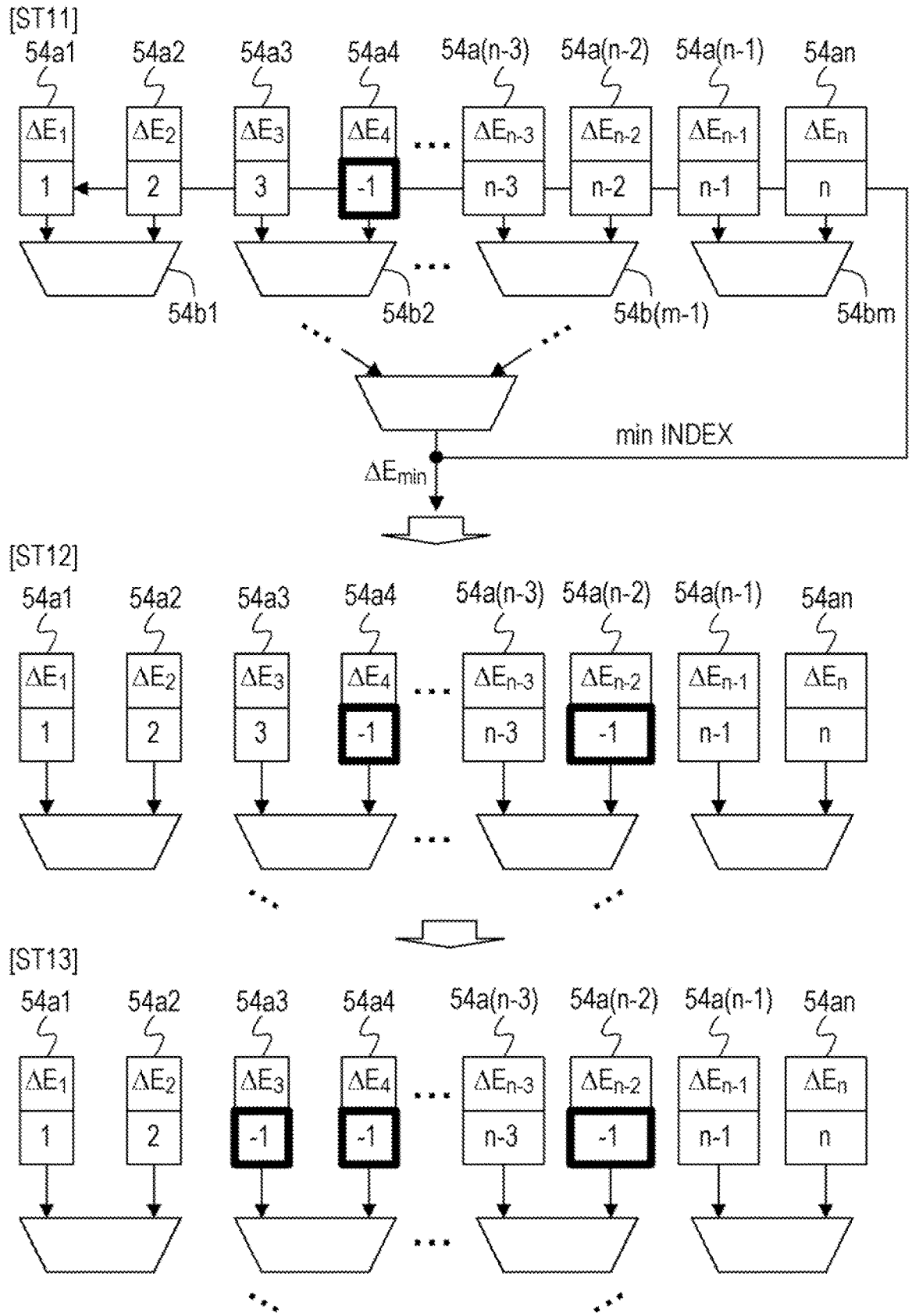
FIG. 21 is a diagram illustrating a selection example by the ΔE selection unit.

Next, a selection example of the ΔE selection unit 540 by the selection logic Z1 will be described. FIG. 21 is a diagram illustrating a selection example by the ΔE selection unit. For example, as a result of first selection by the ΔE selection unit 540, the selector 54q1 sets an index stored in the register 54a4 to "−1" (invalid value) (Step ST11). If the index is set to "−1", ΔE$_4$ stored in the register 54a4 is excluded from candidates for the subsequent selection by the ΔE selection unit 540.

Then, as a result of second selection by the ΔE selection unit 540, the selector 54q1 sets an index stored in the register 54a(n-2) to "−1" (invalid value) (Step ST12). If the index is set to "−1", ΔE$_{n-2}$ stored in the register 54a(n-2) is excluded from candidates for the subsequent selection by the ΔE selection unit 540.

Then, as a result of third selection by the ΔE selection unit 540, the selector 54q1 sets an index stored in the register 54a3 to "−1" (invalid value) (Step ST13). If the index is set to "−1", ΔE$_3$ stored in the register 54a3 is excluded from candidates for the subsequent selection by the ΔE selection unit 540.

In this manner, ΔE$_{min}$ output in a state where setting of "−1" (invalid value) by the selector 54q1 has been performed (k-1) times is employed as ΔE$_k$, and thus it is possible to select the k-th ΔE$_k$ from the top among {ΔE$_i$}$_{min}$ stored in the ΔE holding unit 520. For example, in a case of k=10, it is possible to obtain desired ΔE$_k$ by repeating setting of "−1" by the selector 54q1 nine times. The Δy calculation unit 74 calculates the offset increment value Δy based on ΔE$_k$ selected by the ΔE selection unit 540.

As described above, it is possible to realize the function of the Δy calculation unit 71 or the Δy calculation unit 74 realized by the CPU 51 described in the second and third embodiments, by hardware. Since the Δy calculation function is realized by hardware, a required time of the Δy calculation step between Steps ST2 and ST4 and between Steps ST4 and ST6 illustrated in FIG. 11 is reduced, and thus it is possible to further reduce the calculation time of an optimization problem while suppressing deterioration in accuracy of the solution.

The control of the optimization device 10 in the first embodiment may be realized by causing the processor such as the CPU in the optimization device 10 to execute the program. The control of the optimization devices 50, 50a, and 500 in the second to fourth embodiments may be realized by causing the CPU 51 to execute the program. The program may be recorded in a computer-readable recording medium 63.

For example, it is possible to circulate the program by distributing the recording medium 63 in which the program is recorded. The program may be stored in another computer and distributed through a network. For example, the computer may store (install), in a storage device such as the RAM 62 or the HDD 63, the program recorded in the recording medium 63 or the program received from the other computer and read the program from the storage device and execute the program. The holding unit 15 holds the second change value of the energy value which has been calculated by the energy calculation unit 13 and corresponds to each of a predetermined number of state transitions, in a plurality of entries corresponding to the input identification information k. When the transition control unit 16 stochastically determines whether or not any of the plurality of state transitions is accepted, by a relative relation between the first change value and thermal excitation energy based on the temperature value, the first change value of the energy value calculated by the energy calculation unit 13, and a random number value, the transition control unit 16 stochastically determines whether or not any of the plurality of state transitions is accepted, by adding the offset value y to the first change value. The offset value y is obtained by multiplying the second change value held by any entry selected from the plurality of entries based on the input identification information k, by coefficient information α.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optimization device comprising:
a state holding circuit that holds values of a plurality of state variables included in an evaluation function representing an energy value;
an energy-calculation circuit that calculates
a first change value of the energy value for each of a plurality of state transitions, in a case where a state transition occurs due to a change of any value of a plurality of state variables included in an evaluation function representing the energy value;
a temperature-control circuit that controls a temperature value indicating a temperature;
the state holding circuit holds a second change value of the enemy value which is calculated by the enemy-calculation circuit and corresponds to each of a predetermined number of times of state transitions, in each of a plurality of entries corresponding to identification information; and
a transition-control circuit that stochastically determines whether or not any of the plurality of state transitions is accepted in accordance with a relative relation between the first change value and thermal excitation enemy based on the temperature value, the first change value, and a random number value, stochastically determines whether or not any of the plurality of state transitions is accepted, by adding an offset value to the first change value, the offset value being obtained by multiplying the second change value held by any entry selected from the plurality of entries based on the identification information, by coefficient information.

2. The optimization device according to claim 1, wherein the transition-control circuit obtains identification information and the coefficient information.

3. The optimization device according to claim 1, wherein, when a minimum value of the energy value is updated, the state holding circuit updates the held second change value by a change value of the energy value corresponding to a state transition from a state at the minimum value.

4. The optimization device according to claim 2,
wherein the identification information indicates an integer k which is equal to or greater than 1 and is smaller than values of the plurality of state variables, and
the transition-control circuit calculates the offset value by selecting the second change value corresponding to a k-th smallest absolute value among a plurality of second change values and multiplying the selected second change value by the coefficient information.

5. The optimization device according to claim 4,
wherein the transition-control circuit acquires the plurality of second change values held by the processor and updates the offset value every time a determination is made as to whether or not state transitions for the plurality of state variables are possible for a predetermined number of times.

6. The optimization device according to claim 1,
wherein the transition-control circuit
adds a value to the first change value in a case where none of the plurality of state transitions is accepted, the value being obtained by accumulating the offset value a number of times proportional to a length of a period in which determination that none of the plurality of state transitions is accepted is continuously performed, and
sets the offset value to 0 in a case where any of the plurality of state transitions is accepted.

7. The optimization device according to claim 1, wherein the state holding circuit is configured to hold values of the plurality of state variables at a minimum value of the energy value in a case where the minimum value of the energy value is updated; and
the transition-control circuit is configured to calculate the second change value corresponding to each state transition from a state at the minimum value, based on values of the plurality of state variables, every time determination is made as to whether or not state transitions for the plurality of state variables are possible a predetermined number of times.

8. A control method of an optimization device including a state holding circuit that holds values of a plurality of state variables included in an evaluation function representing an energy value, the method comprising:
calculating a first change value of the energy value for each of a plurality of state transitions when a state transition occurs due to a change of any value of the plurality of state variables, by an energy-calculation circuit in the optimization device;
controlling a temperature value indicating a temperature, by a temperature-control circuit in the optimization device;
holding a second change value of the energy value which is calculated by the energy-calculation circuit and corresponds to each of a predetermined number of times of state transitions, in each of a plurality of entries corresponding to identification information, by a holding circuit in the optimization device; and
when a transition-control circuit in the optimization device stochastically determines whether or not any of the plurality of state transitions is accepted in accordance with a relative relation between the first change value and thermal excitation energy based on the temperature value, the first change value, and a random number value, stochastically determining whether or not any of the plurality of state transitions is accepted, by adding an offset value to the first change value, the offset value being obtained by multiplying the second change value held by any entry selected from the plurality of entries based on the identification information, by coefficient information.

9. A non-transitory computer-readable recording medium having stored therein a program that, when executed by a processor, causes the processor to be configured to:
calculate a first change value of an energy value for each of a plurality of state transitions when a state transition occurs due to a change of any value of a plurality of state variables included in an evaluation function representing the energy value;
control a temperature value indicating a temperature;
hold a second change value of the enemy value which is calculated by the enemy-calculation circuit and corresponds to each of a predetermined number of times of state transitions, in each of a plurality of entries corresponding to identification information; and stochastically determine whether or not any of the plurality of state transitions is accepted in accordance with a relative relation between the first change value and thermal excitation energy based on the temperature value, the first change value, and a random number value, stochastically determines whether or not any of the plurality of state transitions is accepted, by adding an offset value to the first change value, the offset value being obtained by multiplying the second change value held by any entry selected from the plurality of entries based on the identification information, by coefficient information.

* * * * *